United States Patent

Higasayama et al.

[11] Patent Number: 5,953,233
[45] Date of Patent: Sep. 14, 1999

[54] PROCESS OF GENERATING DISCRETE POINTS DEFINING CUTTER PATH, SO AS TO MEET SELECTED WORKPIECE MACHINING REQUIREMENTS

[75] Inventors: Haruhisa Higasayama, Kasugai; Hagemu Kato; Makoto Yokoyama, both of Toyota, all of Japan

[73] Assignee: Toyota Jidosha Kabushiki Kaisha, Toyota, Japan

[21] Appl. No.: 08/822,835

[22] Filed: Mar. 24, 1997

[30] Foreign Application Priority Data

Mar. 29, 1996 [JP] Japan .................................. 8-075659

[51] Int. Cl.[6] .................................................. G05B 19/41
[52] U.S. Cl. .................. 364/474.3; 318/573; 364/474.31
[58] Field of Search ........... 364/474.01, 474.28–474.31, 364/474.24, 474.15; 318/568.1, 569–573; 395/87

[56] References Cited

U.S. PATENT DOCUMENTS

| | | | |
|---|---|---|---|
| 4,453,221 | 6/1984 | Davis et al. | 395/87 |
| 4,683,543 | 7/1987 | Hirasawa et al. | 395/87 |
| 5,394,323 | 2/1995 | Yellowley et al. | 364/167.01 |
| 5,396,160 | 3/1995 | Chen | 318/573 |

FOREIGN PATENT DOCUMENTS

| | | |
|---|---|---|
| A1-0 640 900 | 3/1995 | European Pat. Off. . |
| A-5-61516 | 3/1993 | Japan . |
| A-5-253792 | 10/1993 | Japan . |
| A-6-187029 | 7/1994 | Japan . |
| A-7-241748 | 9/1995 | Japan . |

OTHER PUBLICATIONS

E, Schrufer: "Signalverarbeitung" 1990, Hanser, Munchen XP002093762, pp. 77–83.

*Primary Examiner*—William Grant
*Assistant Examiner*—Steven R. Garland
*Attorney, Agent, or Firm*—Oliff & Berridge, PLC

[57] ABSTRACT

A process of generating discrete points to be followed by a cutter during movements of the cutter to machine a workpiece, including a step of operating a computer including a data processor, to select at least one of different discrete point generating conditions stored in a memory of the computer, according to a command entered by an operator of the computer, each discrete point generating condition including at least one requirement that should be satisfied when the discrete points are generated so as to define a cutter path, a step of operating the computer to calculate an interval of the discrete points, according to the selected discrete point generating condition or conditions, and a step of operating the computer to generate the discrete points on the basis of the calculated interval, such that the discrete points are spaced apart from each other by the interval. The discrete point generating conditions may include requirements associated with velocities of the cutter during machining of the workpiece.

17 Claims, 17 Drawing Sheets

CALCULATION TO OBTAIN CURVE DEFINING EQUATIONS

GENERATION OF DISCRETE CUTTER PATH DEFINITION POINTS

AUXILIARY CUTTER MOVEMENTS

GENERATION OF DISCRETE CUTTER PATH DEFINITION POINTS

○ : CAM-GENERATED DISCRETE POINTS
× : POINT OF INTERPOLATION BY CNC 12
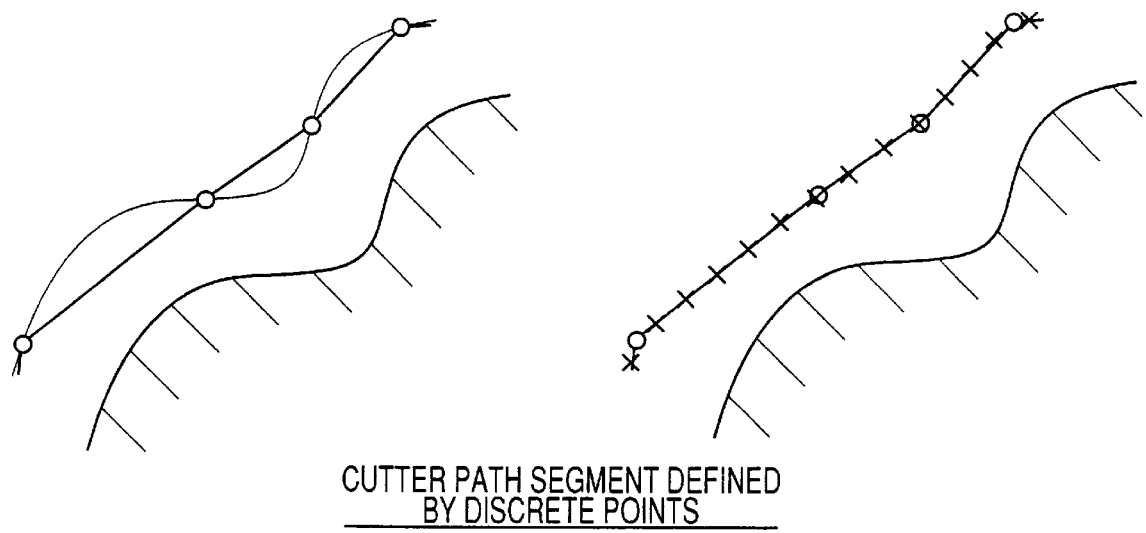
CUTTER PATH SEGMENT DEFINED
BY DISCRETE POINTS
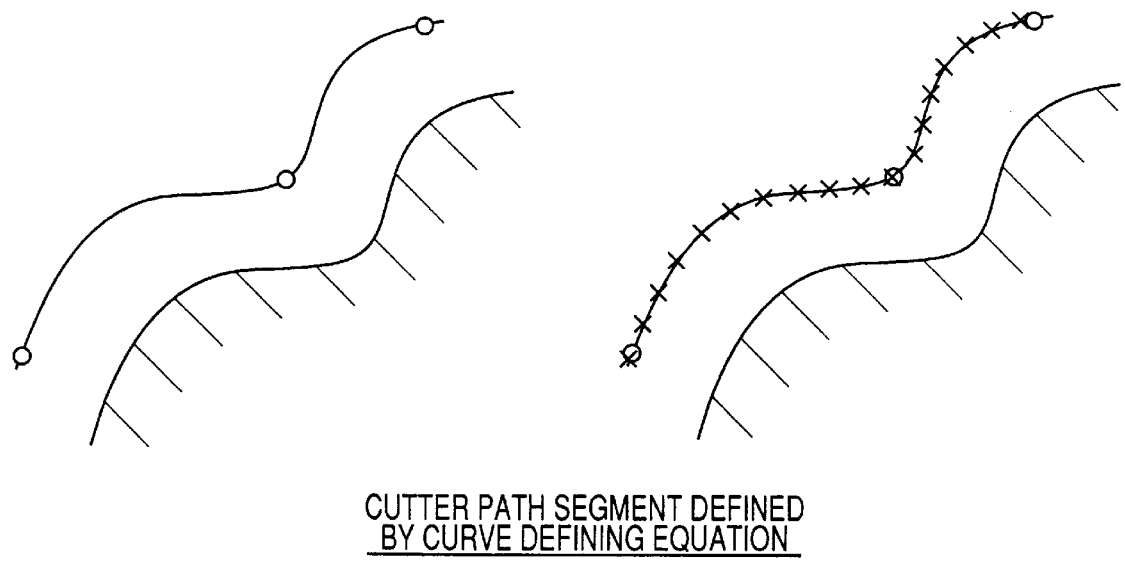
CUTTER PATH SEGMENT DEFINED
BY CURVE DEFINING EQUATION
FIG. 15

PROCESS OF GENERATING DISCRETE POINTS DEFINING CUTTER PATH, SO AS TO MEET SELECTED WORKPIECE MACHINING REQUIREMENTS

The present application is based on Japanese Patent Application No. 8-75659 filed Mar. 29, 1996, the content of which is incorporated hereinto by reference.

CROSS REFERENCE TO RELATED APPLICATIONS

Not Applicable.

BACKGROUND OF THE INVENTION

1. Field of the Invention

The present invention relates in general to a process of generating cutter path data representative of a succession of discrete points which generally define a cutter path to be followed by a cutting tool or cutter for machining a workpiece. More particularly, the invention is concerned with improvements in the process of determining such discrete cutter path definition points.

2. Discussion of the Related Art

Generally, a manufacture of a desired part or product by machining a workpiece on an NC (numerically controlled) machine tool includes a CAD (computer aided design) data processing step, a CAM (computer aided manufacturing) data processing step, and an NC machining step, which are implemented in the order of description, as illustrated in FIG. 17.

In the CAD data processing step, part geometry data in the form of surface models and solid models which represent a desired cutting profile of the workpiece (i.e., a desired shape of the part) are generated according to commands generated by the operator of a CAD processor.

In the CAM data processing step, successive discrete points generally defining a cutter path are obtained by calculation on the basis of the part geometry data received by a CAM processor, so that a predetermined reference point of the cutter is moved through those discrete points in the subsequent NC machining step. The reference point of the cutter may be a center point of the cutter, for example. The cutter path defined by the discrete points (hereinafter referred to as "discrete cutter path definition points") is offset from the desired cutting profile of the workpiece by a distance determined by the cutter configuration, in the direction away from the desired cutting profile. For instance, the offset distance of the cutter path is determined by the radius of the cutter. In the CAM data processing step, cutter path data representative of the discrete cutter path definition points are then generated.

The CAM data processing step further includes a post-processing operation to convert the cutter path data to NC data (numerical control data) suitable for use in the subsequent NC machining step in which the workpiece is machined into the desired part. Generally, the NC data include cutter path data representative of the discrete cutter path definition points, and interpolation data indicative of either linear interpolation or circular interpolation of the adjacent discrete cutter path definition data. In the linear interpolation, the adjacent discrete points are connected by a straight segment. In the circular interpolation, the adjacent discrete points are connected by a circular arc segment.

In the NC machining step, the NC data are received by a numerical control device, which applies cutter motion commands to the numerically controlled or NC machine tool, so that the NC machine tool is operated to move the cutter along the cutter path according to the cutter motion commands, for thereby machining the workpiece to produce the part having the desired shape.

Thus, the series of steps to manufacture the desired part includes a data processing operation for generating the discrete cutter path definition points generally defining the path to be taken by the cutter. This data processing operation is implemented after the part geometry data are prepared and before the cutter motion commands are generated. In the example of FIG. 17, the data processing operation in question is the operation to obtain the discrete cutter path definition points by calculation in the CAM data processing step.

In the conventional CAM data processing step, the discrete cutter path definition points are determined on the basis of nominal profile or geometry of the part (desired cutting profile of the workpiece), and a predetermined tolerance which is a permissible maximum amount of deviation of the cutter path generally defined by the succession of discrete points, from a nominal cutter path which exactly follows the nominal part profile, as indicated in FIG. 19. The cutter path generally defined by the discrete points consists of straight segments which connect the adjacent discrete points. That is, the cutter path is approximated by the discrete points, so as to minimize the required volume of the cutter path data while assuring a minimum sufficient degree of NC machining accuracy of the workpiece (dimensional accuracy of the part manufactured).

If the tolerance used in determining the discrete cutting path definition points is made relatively small, the requirement for reducing the volume of the cutter path data may be satisfied while assuring a satisfactory degree of the NC machining accuracy. However, there are other requirements in the manufacture of a part by NC machining, such as a requirement for increased machining efficiency while assuring the satisfactory NC machining accuracy. A research conducted by the inventors of the present invention has indicated an importance of taking into account conditions associated with movement velocities of the cutter, even in the step of generating or determining the discrete cutter path definition points which are subsequently processed into the NC data used in the NC machining step.

In determining the discrete cutter path definition points, however, the conventional CAM data processing technique does not allow the operator to take into account the conditions other than the tolerance indicated above, such as the conditions associated with the movement velocities of the cutter. Thus, the conventional technique suffers from drawbacks arising from the incapability to satisfy the above requirements in the NC machining.

SUMMARY OF THE INVENTION

It is therefore an object of the present invention to provide a process of generating discrete cutter path definition points, which permits optimization of the cutter path so as to meet the NC machining requirements indicated above.

The object may be achieved according to a first aspect of this invention, which provides a process of generating a succession of discrete points to be followed by a cutter during movements of the cutter to machine a workpiece, comprising: (a) a step of operating a computer including a data processor, to select at least one of a plurality of different discrete point generating conditions stored in a memory of the computer, according to a command entered by an operator of the computer, each of the different discrete point generating conditions including at least one requirement that should be satisfied when the discrete points are generated so as to define a cutter path; (b) a step of operating the computer to calculate an interval of the discrete points in the direction of the succession, according to the selected at least one of the discrete point generating conditions; and (c) a step of operating the computer to generate the discrete points on the basis of the calculated interval, such that the discrete points are spaced apart from each other by the interval in the direction of the succession.

In the process according to the first aspect of this invention, the operator of the computer selects a desired one or more of the different discrete point generating conditions stored in the memory, and the computer generates a succession of discrete points which generally define a cutter path along which the cutter is moved. Since the different discrete point generating conditions correspond to different requirements or needs in machining the workpiece to manufacture a desired part, the present process permits the workpiece to be machined so as to satisfy the desired requirements or needs.

As described below in detail, the plurality of different discrete point generating conditions may include respective cutter-velocity-related requirements which are associated with movement velocities of the cutter during machining of the workpiece and which are different from each other.

The object indicated above may also be achieved according to a second aspect of the invention, which provides a process of generating a succession of discrete points to be followed by a cutter during movements of the cutter to machine a workpiece, comprising: (a) a step of calculating an interval of said discrete points in the direction of said succession, so as to meet at least one cutter-velocity-related requirement associated with movement velocities of said cutter during machining of the workpiece; and (b) a step of generating said discrete points on the basis of the calculated interval, such that said discrete points are spaced apart from each other by said interval in the direction of said succession.

In the process according to the second aspect of the invention, the discrete points defining the cutter path are generated, taking into account the cutter-velocity-related requirement or requirements which relate to the movement velocities of the cutter. Namely, the requirement or requirements associated with the movement velocities of the cutter during machining of the workpiece is/are taken into account in the process of determining the discrete points defining the cutter path, prior to the machining process. Conventionally, the cutter-velocity-related requirements are taken into account only in the process of machining of the workpiece. Accordingly, the present process permits increased versatility to meet various requirements relating to the machining of the workpiece.

The term "movement velocities of the cutter" is interpreted to mean not only the velocities of feeding movements of the cutter (i.e., speeds at which a reference of the cutter is moved relative to the workpiece), but also the rotating speed of the cutter about its axis. The cutter-velocity-related requirements may include a predetermined upper limit of a resultant movement velocity of the cutter, and a predetermined upper limit of a variation of a movement velocity of the cutter along each controllable axis, for example. These upper limits are associated with the velocities. The cutter-velocity-related requirements may further include a predetermined upper limit of centrifugal acceleration of the cutter, and predetermined upper limits of acceleration in the direction of the succession of the discrete points. The term "interval of the discrete points" is generally interpreted to mean a length of straight segments of a bent cutter path defined by the discrete points, but may be interpreted to mean a length of curved segments of a nominal cutter path on which the discrete points are located.

In a first preferred form of the first or second aspect of this invention described above, the process further comprises a step of generating curve defining functional equations representative of curves which define a nominal cutter path, on the basis of a geometry of a part to be manufactured by machining of the workpiece. In this case, the discrete points are generated on the basis of the generated functional equations and the interval of the discrete points.

According to the present invention, the discrete points can be generated on the basis of the desired part geometry and the selected discrete point generating condition or conditions or the cutter-velocity-related requirement or requirements. If the generated discrete points are found to be inadequate, the process should be repeated to generate adequate discrete points. In the above-indicated first preferred form of the invention, the curve defining functional equations representative of the curved segments of the nominal cutter path are first obtained on the basis of the part geometry, and then the discrete points are generated on the basis of the obtained functional equations. If the discrete points originally generated on the basis of the functional equations are found inadequate, adequate discrete points may be generated by merely changing an appropriate variable or variables in the functional equations. In other words, the use of the same functional equations permits easy correction of the inadequate discrete points or addition of discrete points.

Further, since the functional equations represent the nominal cutter path which exactly follows the desired part geometry, all of the discrete points generated lie on the nominal cutter path. In addition, the present form of the invention is particularly effective for moving the cutter along a curved path, since the curved segments of the nominal cutter path are represented by the respective functional equations.

The interval of the discrete points is usually defined as the length of each straight segment of a bent cutter path defined by the discrete points. In this case, two adjacent discrete points are determined to be located at two points of intersection between the nominal cutter path (curved path) and a sphere which has a radius equal to the interval of the discrete points and the center of which is located on the nominal cutter path. The thus determined two discrete points are located on the nominal cutter path and are spaced apart from each other by the interval. It is also noted that the nominal cutter path does not necessarily lie on the same plane. The concept of determining the two intersection points of the sphere and the nominal cutter path as the two adjacent discrete points permits the generation of the discrete points even where the nominal cutter path does not lie on the same plane. Where the nominal cutter path lies on the same plane, the two intersection points between the nominal cutter path and a circle the radius of which is equal to the interval of the discrete points and the center of which is located on the nominal cutter path. The discrete points may also be generated by projecting the nominal cutter path in a direction which is almost perpendicular to the cutter path, and obtaining intersection points between this projection of the nominal cutter path and a circle which has a radius equal to the interval of the discrete points. Any one of the above-indicated methods of determining the intersection points as the adjacent discrete points permits the generation of the discrete points on the nominal cutter path (curved path).

Thus, the step of generating the discrete points may include a step of positioning a sphere or a circle having a radius equal to the calculated interval of the discrete points, such that the center of the sphere or circle is located on the nominal cutter path represented by the functional equations, and determining each of at least one of two points of intersection between the nominal cutter path and the sphere or circle, as the next discrete point. In this case, the successive discrete points may be generated by moving the center of the sphere or circle along the nominal cutter path, from the last one of the already generated discrete points by the distance equal to the interval.

As described above, the first preferred form of the first or second aspect of the invention permits easy re-generation of the discrete points, and assures a comparatively high degree of freedom in determining the discrete points, and a comparatively high degree of accuracy of the cutter path defined by the generated discrete points, with respect to the nominal cutter path.

In a second preferred form of the first and second aspects of the present invention, the cutter-velocity-related requirements or at least one cutter-velocity-related requirement include or includes a requirement that an acceleration of the cutter during machining of the workpiece by the cutter be held lower than a predetermined upper limit. In this case, the interval of the discrete points is calculated on the basis of said upper limit.

For improving the machining efficiency, it is desirable to determine the interval of the discrete points so as to prevent excessive acceleration and deceleration of the cutter. Where the cutter is fed along a curved path having a comparatively small radius of curvature, for example, it is desirable to reduce the interval of the discrete points, for reducing the angle of change of the cutter path direction, namely, for reducing the change angle between the adjacent two straight segments of the cutter path defined by the discrete points, and for preventing excessive centrifugal acceleration of the cutter. Where the cutter is fed along a curved path having a comparatively large radius of curvature, it is desirable to increase the interval, and prevent excessive acceleration of the cutter in the direction of the succession of the discrete points.

In the light of the finding, the second preferred form of the present process is adapted to calculate the interval of the discrete points on the basis of the upper limit of the acceleration of the cutter, which is one of the cutter-velocity-related requirements.

In one advantageous arrangement of the above second preferred form of the invention, the process further comprises a step of calculating an upper limit $V_{ARmax}$ of a resultant movement velocity of the cutter, on the basis of a radius R of curvature of a nominal path of the cutter and the upper limit $G_{Amax}$ of the centrifugal acceleration $G_A$ of the cutter. In this case, the interval L is calculated on the basis of the upper limit $V_{ARmax}$ and a time interval T at which motion commands to feed the cutter are supplied to a machine tool.

In the above advantageous arrangement, the upper limit $V_{ARmax}$ of the resultant movement velocity of the cutter may be calculated as $\sqrt{R} \times \sqrt{G_{Amax}}$, and the interval L may be calculated as $V_{ARmax} \times T$.

It will be understood from the above explanation that the second preferred form of the present process is adapted to determine the discrete points by taking into account the acceleration of the cutter, so that the machining efficiency can be easily improved.

The above second preferred form of the process may include the feature of the first preferred form of the process described above.

In a third preferred form of the present process, the cutter-velocity-related requirements or at least one cutter-velocity-related requirement include or includes predetermined upper limits of variations in feed rates of the cutter during feeding movements thereof along respective controllable axes. Each of the variations is an amount of change in the feed rate of the cutter along a corresponding one of the controllable axes, between two successive motions of the cutter which correspond respective two motion commands that are successively supplied to a machine tool at a predetermined time interval. In this case, the interval of the discrete points is calculated on the basis of the upper limits of the variations.

The cutter of a machine tool for machining the workpiece is fed under the control of motion commands that are successively supplied to the machine tool at a predetermined time interval. For assuring highly efficient machining of the workpiece, it is desirable that the feed rates of the cutter in the directions of the controllable axes be held substantially constant during successive motions of the cutter corresponding to the successive motion commands. In other words, it is desirable to determine the discrete points so as to prevent excessive amounts of variations in the feed rates of the cutter between two successive motions of the cutter. Where the cutter is fed along a bent cutter path which are defined by the discrete points and which are made similar with the nominal curved cutter path, it is desirable to reduce the interval of the discrete points, for reducing the angle of change of the cutter path direction, and for preventing excessive variations in the feed rates of the cutter along the respective axes. This technique will be described in detail in the description of the preferred embodiments of the invention.

In the light of the above finding, the third preferred form of the present process is adapted to calculate the interval of the discrete points on the basis of the upper limits of the variations in the feed rates of the cutter for the respective controllable axes, which upper limits are used as the cutter-velocity-related requirements.

The above third preferred form of the present process may further comprise a step of calculating an upper limit $V_{ARmax}$ of a resultant movement velocity $V_{AR}$ of the cutter, on the basis of a radius R of curvature of the nominal path of the cutter and a predetermined upper limit $G_{Amax}$ of a centrifugal acceleration $G_A$ of the cutter. In this case, the step of generating the discrete points comprises a step of calculating an upper limit $\theta_{max}$ of an angle of change of direction of the cutter path defined by the discrete points, by dividing the upper limit $\Delta V_{Amax}$ of the variation of the feed rate along each controllable axis by the upper limit $V_{ARmax}$ of the resultant movement velocity $V_{AR}$, and a step of calculating the interval L of the discrete points by multiplying the upper limit $\theta_{max}$ by the radius R of curvature of the nominal path.

In the above case, the upper limit $V_{ARmax}$ may be calculated as $\sqrt{(R)} \times \sqrt{(G_{Amax})}$, and the upper limit $\theta_{max}$ may be calculated as $\sin^{-1}(\Delta V_{Amax}/V_{ARmax})$. Further, the interval L may be calculated as $2 \times R \times \sin(\theta_{max}/2)$.

In the third preferred form of the present process, the variation in the feed rate of the cutter between two successive motions of the cutter along each controllable axis is taken into account in determining the discrete points, so as to improve the machining efficiency.

The above third preferred form of the process may include the feature of the first preferred form of the process described above.

In a fourth preferred form of the present process, the cutter-velocity-related requirements or at least one cutter-velocity-related requirement include or includes a predetermined upper limit of a resultant movement velocity of the cutter during movements of the cutter along controllable axes of a machine tool to machine the workpiece. In this case, the interval of the discrete points is calculated on the basis of the upper limit of the resultant movement velocity and a time interval at which motion commands to feed the cutter along the controllable axes are supplied to the machine tool.

The cutter is fed along the controllable axes according to the motion commands or pulses supplied to the machine tool at the predetermined time interval. A distance of movement of the cutter corresponding to one motion command can be determined by the time interval of the motion commands and the resultant movement velocity of the cutter. In this respect, the interval of the discrete points to be followed by the cutter should correspond to the distance of movement of the cutter corresponding to one motion command.

In the light of the above finding, the fourth preferred form of the present process is adapted to calculate the interval of the discrete points on the basis of the time interval of the motion commands, and the upper limit of the resultant movement velocity of the cutter, which is one of the cutter-velocity-related requirements.

In the above fourth preferred form of the process, the motions of the cutter caused by the motion commands are coincident with the time interval of the motion commands, whereby the cutter is less likely to be unnecessarily decelerated, advantageously resulting in an increase in the machining efficiency of the workpiece.

This fourth preferred form of the process may include the features of the first preferred form of the process.

In a fifth preferred form of the process of the invention, the cutter-velocity-related requirements or at least one cutter-velocity-related requirement include or includes a predetermined upper limit of a resultant movement velocity of the cutter during movements of the cutter along controllable axes of a machine tool to machine the workpiece according to motion commands supplied to the machine tool at a predetermined time interval while the cutter is rotating about an axis thereof. In this case, the interval of the discrete points is calculated on the basis of the upper limit of the resultant movement velocity, and a commanded value of a rotating speed of the cutter, which commanded value is specified by an operator of the machine tool.

The workpiece may be machined by a rotating cutter having at least one cutting blade or insert while the cutter is fed in a first direction to take a cutting pass along a predetermined path. At the end of the cutting pass, the cutter is moved by a suitable in-feed distance in a second direction perpendicular to the first direction, and the cutter is fed again in the first direction to take a second cutting pass. The above-indicated in-feed distance determines the amount of stock removal from the workpiece in the second cutting pass. Thus, a plurality of cutting passes of the cutter are performed to remove the desired total amount of stock removal from the workpiece, to machine a desired portion of the workpiece which is covered by successive cutting regions corresponding to the cutting passes. Each cutting region corresponding to each cutting pass consists of unit cutting areas corresponding to respective motion commands.

In the above case, the length of the unit cutting areas in the first direction decreases with a decrease in the velocity of the feeding movement of the cutter in the first direction, and with an increase in the rotating speed of the cutter.

Therefore, the length of the unit cutting areas is generally considered to be proportional to VL/VR, where VL represents the feeding velocity VL of the cutter, while VR represents the rotating speed VR of the cutter.

To assure a satisfactory surface finish of the machined workpiece (part produced by machining the workpiece, it is important to hold the length of the unit cutting areas substantially constant within each cutting region corresponding to each cutting pass, and in the different cutting regions. The substantially constant length of the unit cutting areas in the different cutting regions results in that the width of each cutting region corresponding to each cutting pass is substantially equal to the above-indicated in-feed distance in the second direction perpendicular to the first direction (feeding direction of the cutter).

Accordingly, to assure the satisfactory surface finish of the machined workpiece, it is important to hold the value VL/VR substantially constant within each cutting region and in the different cutting regions.

In the light of the above finding, the fifth preferred form of the present process is adapted to take into account the upper limit of the resultant movement velocity of the cutter and the commanded rotating speed of the cutter, in determining the interval of the discrete points.

The length of the unit cutting areas corresponding to the motion commands changes with the number N of the cutting blades of the cutter. That is, the length of the unit cutting areas decreases with an increase in the number N, when the feeding velocity VL and rotating speed VR are constant. For instance, an increase in the rotating speed VR of the cutter and an increase in the number N of the cutting blades of the cutter are equivalent to each other, in their effect on the length of the unit cutting areas. Therefore, it is possible to calculate the interval of the discrete points, on the basis of the number N of the cutting blades of the cutter, the commanded rotating speed $S_C$ and the predetermined upper limit $V_{ARmax}$ of the resultant movement velocity of the cutter.

In the above case, the interval L may be calculated as $V_{ARmax}/(S_C \times N)$.

It will be understood from the above explanation that the fifth preferred form of the present process is adapted to generate the discrete points so as to optimize the length of the unit cutting areas, namely, the distance of feeding movement corresponding to each motion command, whereby the surface finish of the machined workpiece can be easily improved, for example.

The fifth preferred form of the process may include the features of the first preferred form of the process.

The process according to the first and second aspects of this invention and the various preferred forms described above may use the upper limit $V_{ARmax}$ as one of the cutter-velocity-related requirements. If this upper limit $V_{ARmax}$ exceeds a commanded value $V_{CR}$ of the resultant movement velocity which is specified by the operator, the commanded value $V_{CR}$ may be set as the upper limit. Namely, the commanded value $V_{CR}$ entered by the operator may be used as the upper limit of the actual resultant movement velocity of the cutter, so that the interval of the discrete points is determined so as to prevent the actual resultant movement velocity $V_{AR}$ from exceeding the commanded value $V_{CR}$.

The object indicated above may also be achieved according to the following preferred forms of the invention:

(1) A process according to the first preferred form of the first or second aspect of the invention described above, wherein said nominal cutter path consists of a plurality of curved segments which are represented by the curve defining functional equations, respectively, while the interval of the discrete points is calculated for each of the curved segments, so as to meet the selected discrete point generating condition or cutter-velocity-related requirement or requirements, and the discrete points are generated on each curved segment such that the discrete points are spaced apart from each other by the calculated interval. This process may include the features of any of the preferred forms of the invention described above.

(2) A process according to the above preferred form (1), wherein the step of calculating the interval of the discrete points comprises a step of obtaining a radius of curvature representative of each curved segment of the nominal cutter path, calculating the upper limit of the resultant movement velocity of the cutter on the basis of the obtained radius of curvature and the upper limit of the centrifugal acceleration of the cutter as the cutter-velocity-related requirement, and a step of calculating the interval on the basis of the calculated upper limit of the resultant movement velocity of the cutter.

(3) A process according to the first preferred form of the first or second aspect of this invention, or the above preferred form (1) or (2), wherein the step of generating the curve defining functional equations comprises: (a) a step of calculating a first cutter path definition plane on the basis of part geometry data representative of a desired cutting profile of the workpiece, and cutter data including radius data representative of a radius of the cutter, the first cutter path definition plane being offset by a distance determined by the radius of the cutter, from the desired cutting profile of the workpiece, in the direction away from the workpiece; (b) a step of calculating a plurality of second cutter path definition planes which intersect the first cutter path definition plane and which cooperate with the first cutter path definition plane to provide a plurality of intersection lines therebetween; and (c) generating the curve defining functional equations representative of the intersection lines as a plurality of nominal cutter paths. This preferred form of the process may include the features of any one of the above-indicated preferred forms of the process.

(4) A process according to the preferred form (1) or (2), wherein the step of generating the curve defining equations comprises: (a) a step of calculating cross sectional profiles of a part to be manufactured by machining of the workpiece, in a plurality of flat or curved planes, on the basis of part geometry data representative of a desired cutting profile of the workpiece; and (b) a step of obtaining a plurality of provisional discrete points which are offset by a distance determined by a radius of the cutter, from the desired cutting profile of the workpiece, in the direction away from the workpiece, and obtaining the curve defining equations on the basis of the obtained provisional discrete points. This preferred form may include the features of any one of the above preferred forms of the process.

(5) A process according to the first or second aspect of the invention described above, or any one of the first through fifth preferred forms described above and the above preferred forms (1)–(4), which process is practiced in a CAM (computer aided manufacturing) data processing step in the manufacture of a part by machining the workpiece on a numerically controlled (NC) machine tool, with the cutter being moved according to motion commands supplied to the machine tool according to NC (numerical control) data, in an NC (numerical control) machining step, wherein cutter path data representative of the discrete points generated in the CAM data processing step are used as the numerical control data to be supplied to the machine tool, the discrete points being generated on the basis of part geometry data representative of a desired cutting profile of the workpiece, in the CAM data processing step, such that the discrete points are spaced apart from each other by the interval which is calculated on the basis of the part geometry data and the selected discrete point generating condition or cutter-velocity-related requirements.

In the above form (5), the discrete points defining the cutter path are determined prior to the NC machining step, so as to meet the various requirements or needs of the user of the machine tool in the machining of the workpiece, so that the motion commands generated based on the thus determined discrete points in the NC machining step suitably reflect such machining requirements or needs. Thus, the present process permits easy optimization of the motion commands so as to satisfy the machining needs.

(6) A process according to the first or second aspect of the invention, or any one of the first through fifth preferred forms described above and the above preferred forms (1)–(5), further comprising a step of generating, on the basis of the discrete points, motion commands to be supplied to a machine tool for moving the cutter along the cutter path defined by the discrete points.

According to a third aspect of this invention, there is provided a method of machining a workpiece by a cutter movable on a machine tool, comprising: (a) the process, according to the first or second aspect of the invention described above, of generating a succession of discrete points to be followed by the cutter during movements of the cutter to machine the workpiece; (b) a step of generating motion commands to move the cutter along the cutter path defined by the discrete points generated in the process; and (c) a step of controlling the machine tool to move the cutter according to the motion commands.

According to a fourth aspect of this invention, there is further provided a data storage medium for storing a program for executing the process according to the first or second aspect of the invention, such that the program is readable by a computer.

The data storage medium may be a floppy disk, a magnetic tape, a magnetic disk, a magnetic drum, a magnetic card, an optical disk, a magneto-optical disk, a CD-ROM, or an IC card.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

Figure 2:
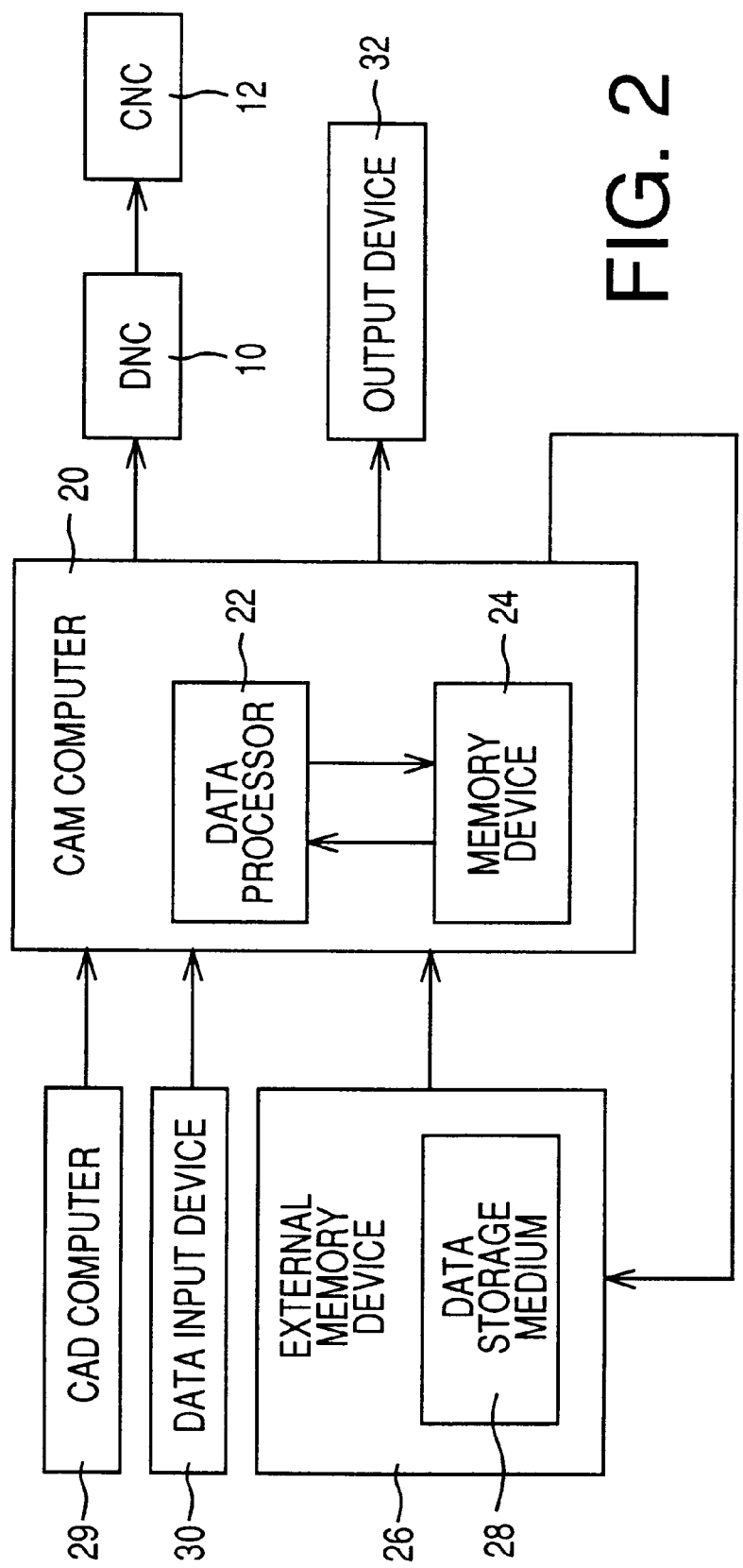
FIG. 2 is a block diagram showing a cutter path data generating apparatus suitable for practicing the process of the invention.
Figure 3:
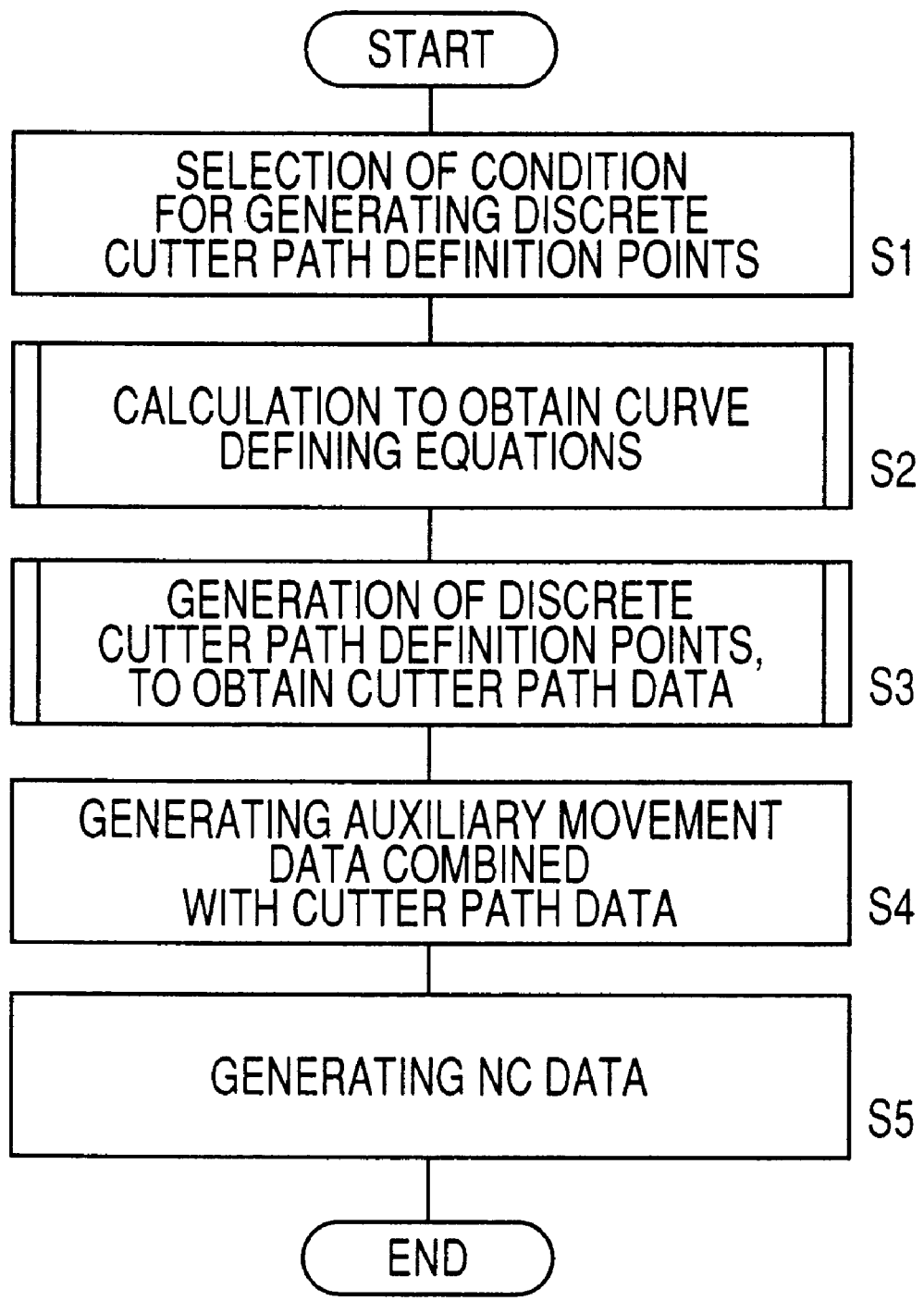
FIG. 3 is a flow chart illustrating a program which is executed as needed by a computer of the apparatus of FIG.
Figure 4:
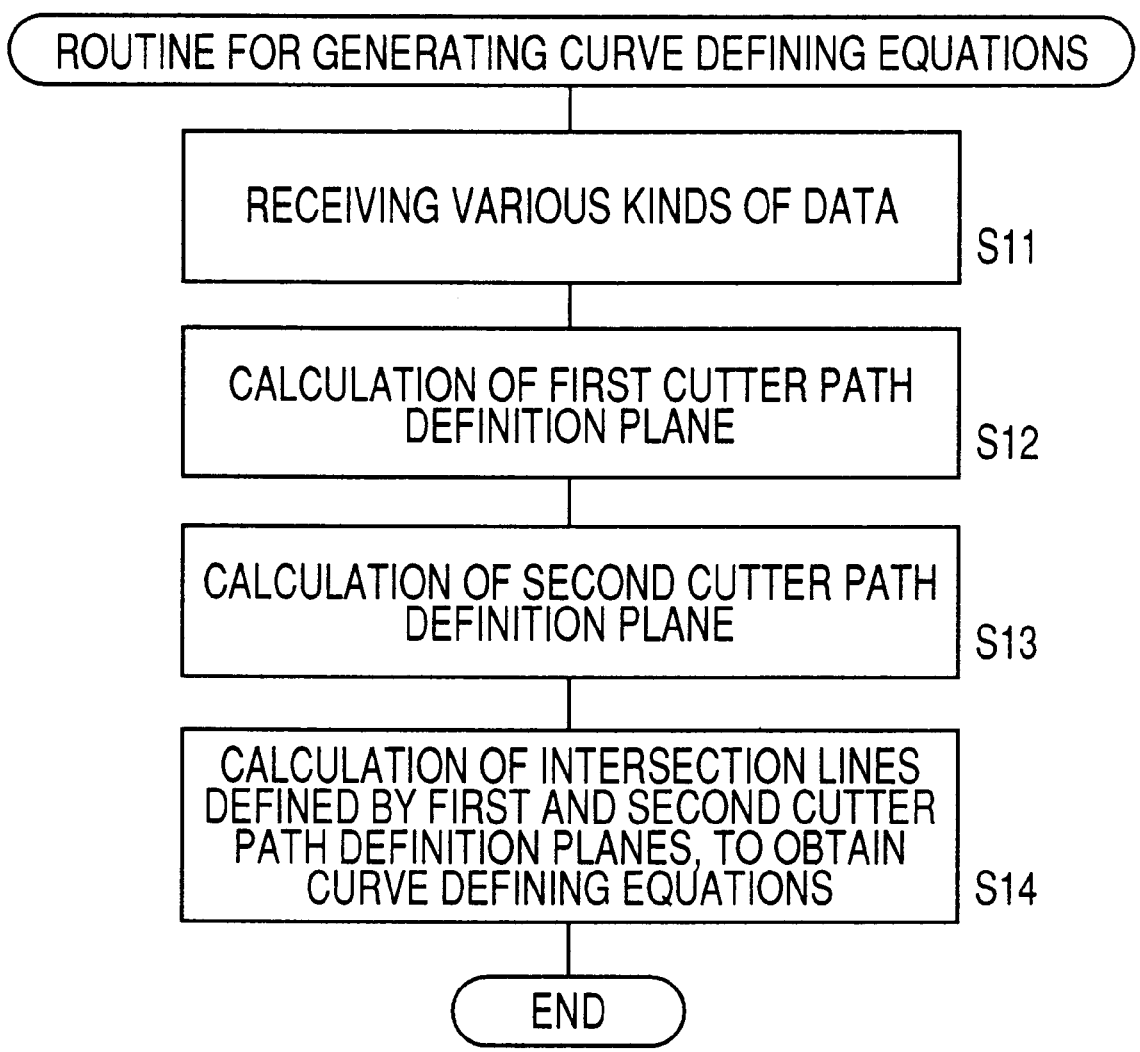
Figure 5:
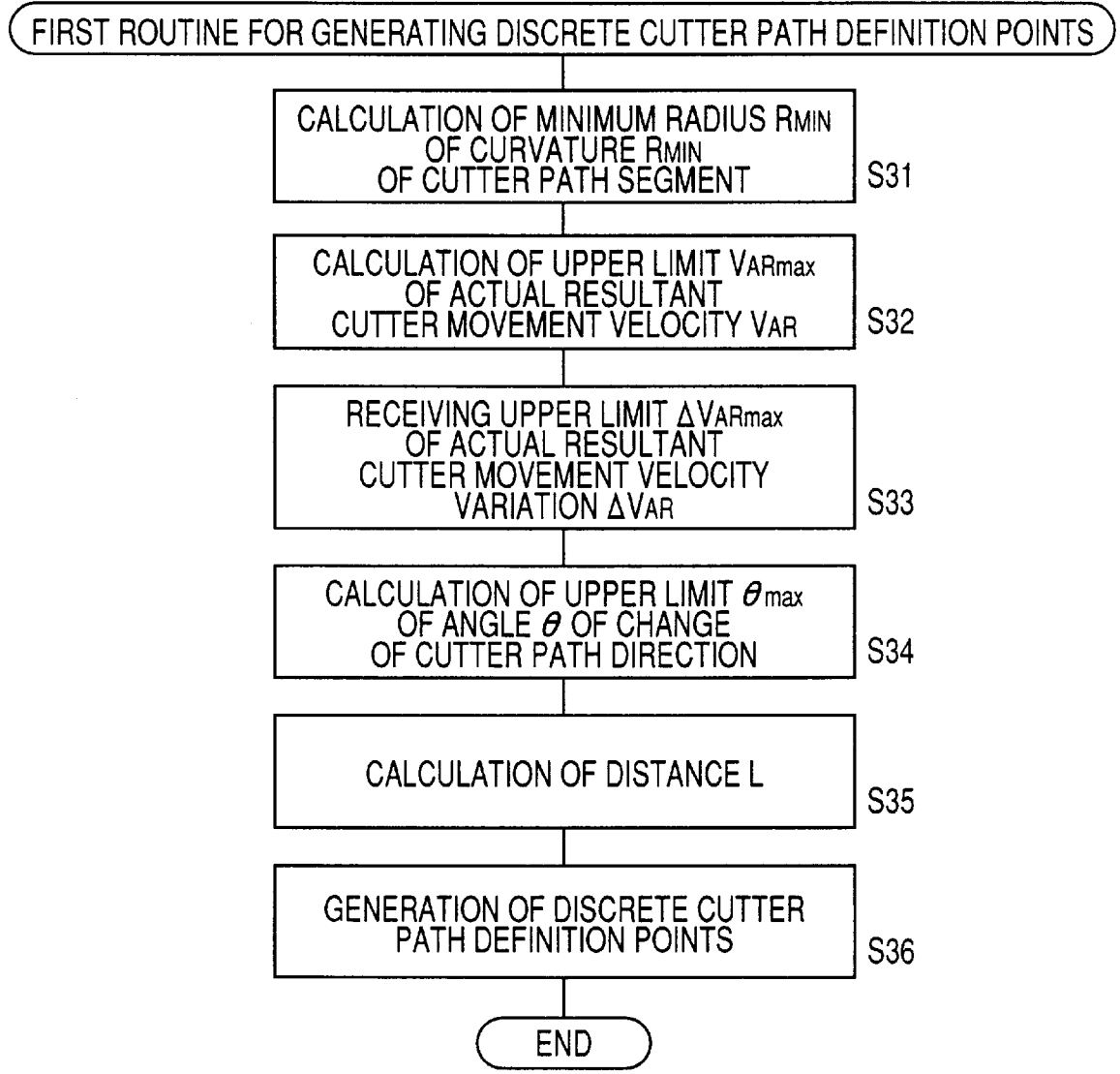
Figure 6:
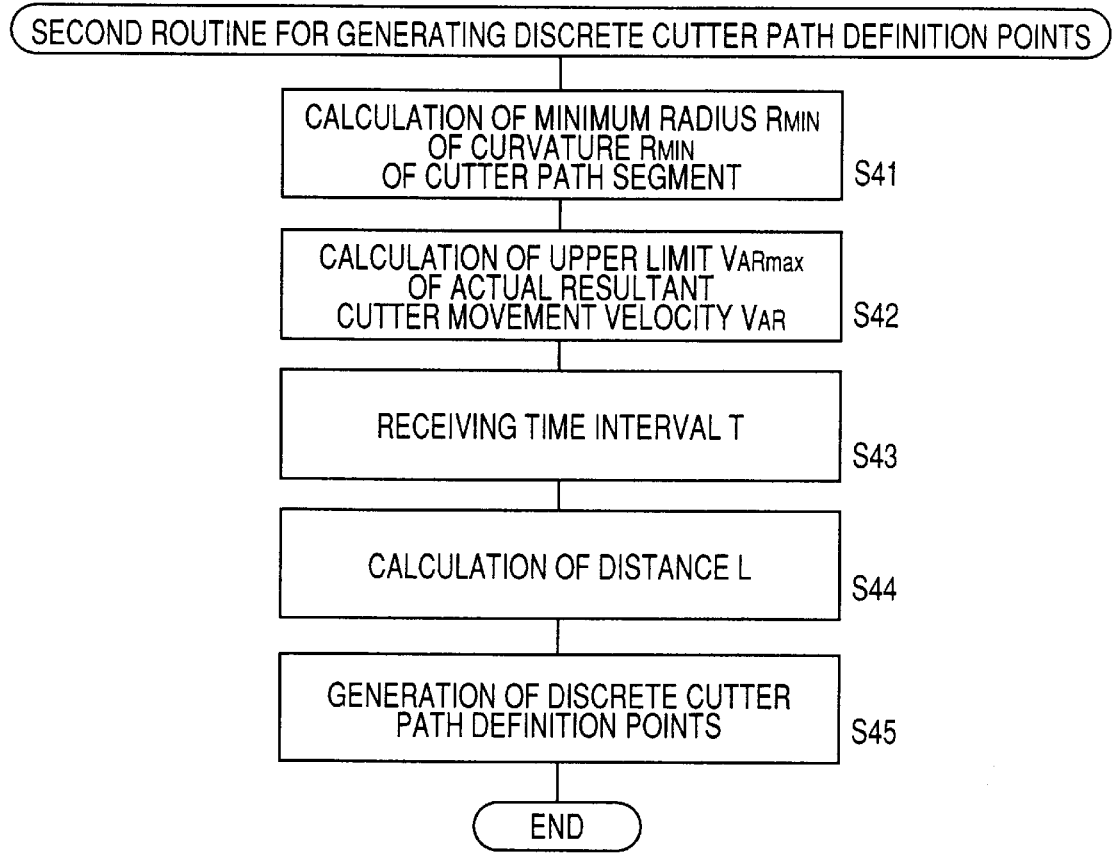
Figure 7:
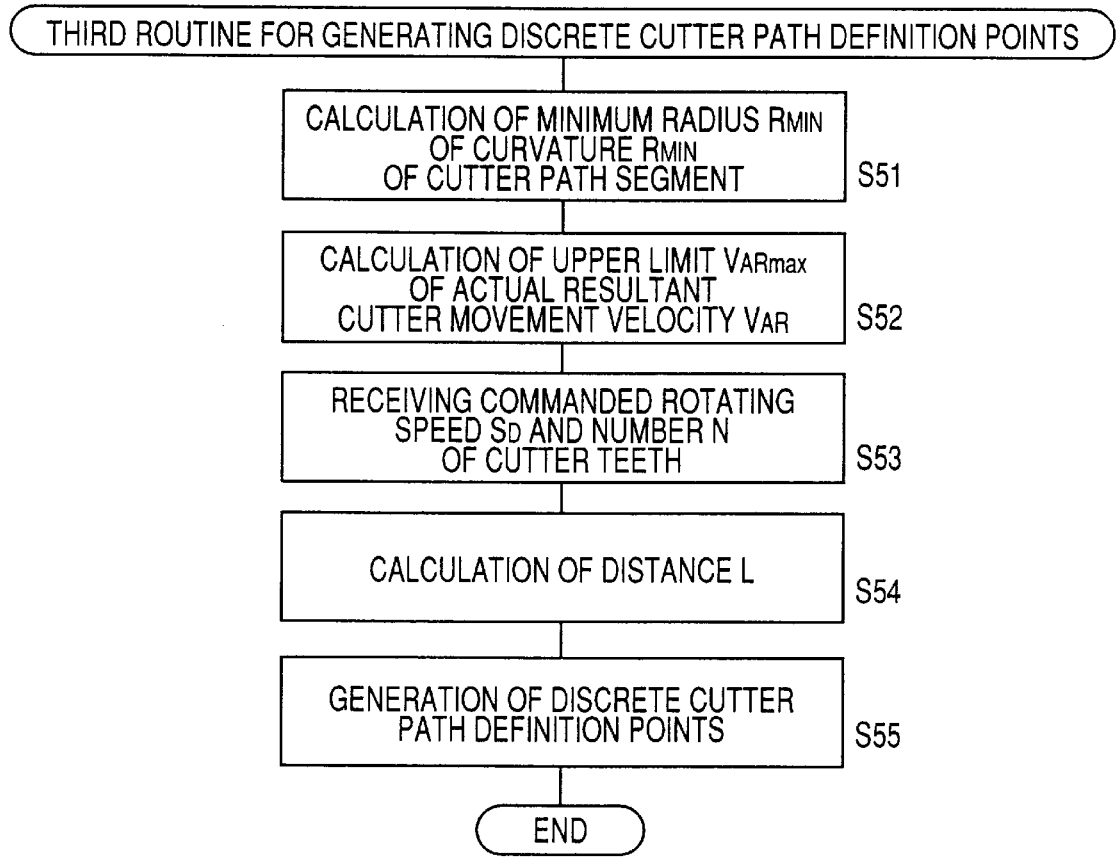
Figure 8:
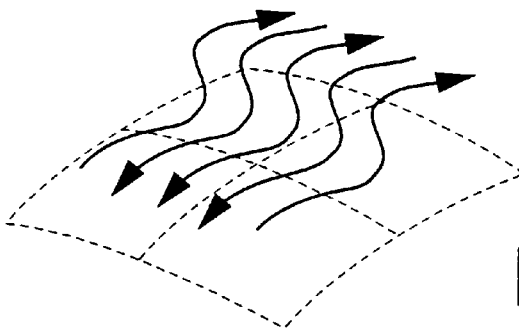
Figure 9:
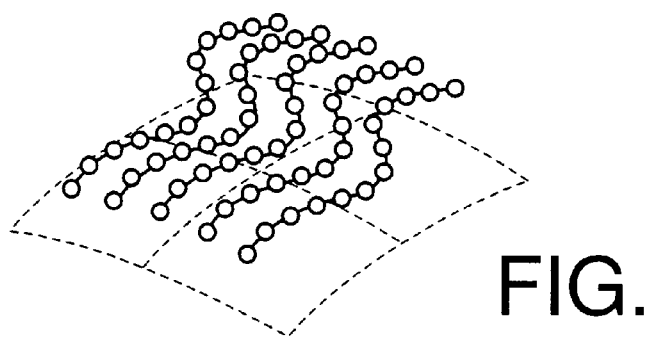
Figure 10:
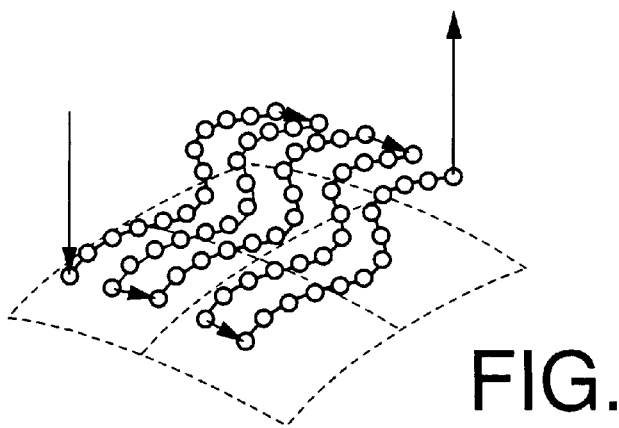
Figure 11A:
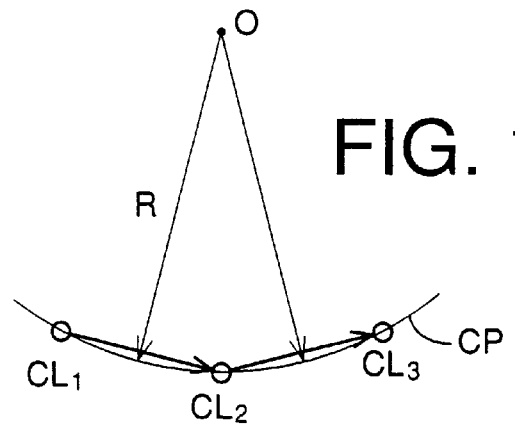
Figure 11B:
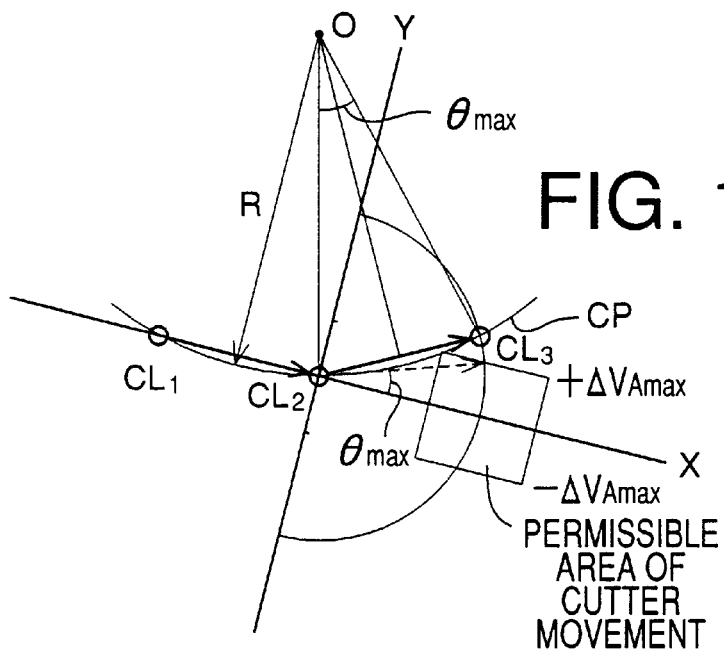
Figure 11C:
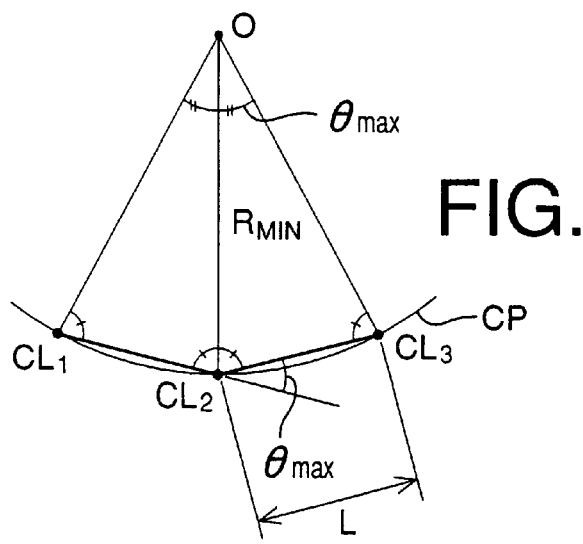
Figure 12:
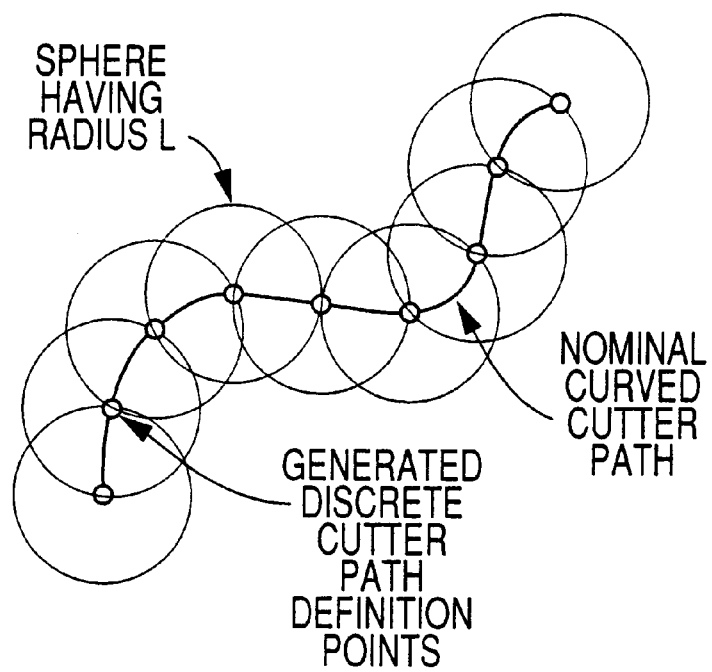
Figure 13:
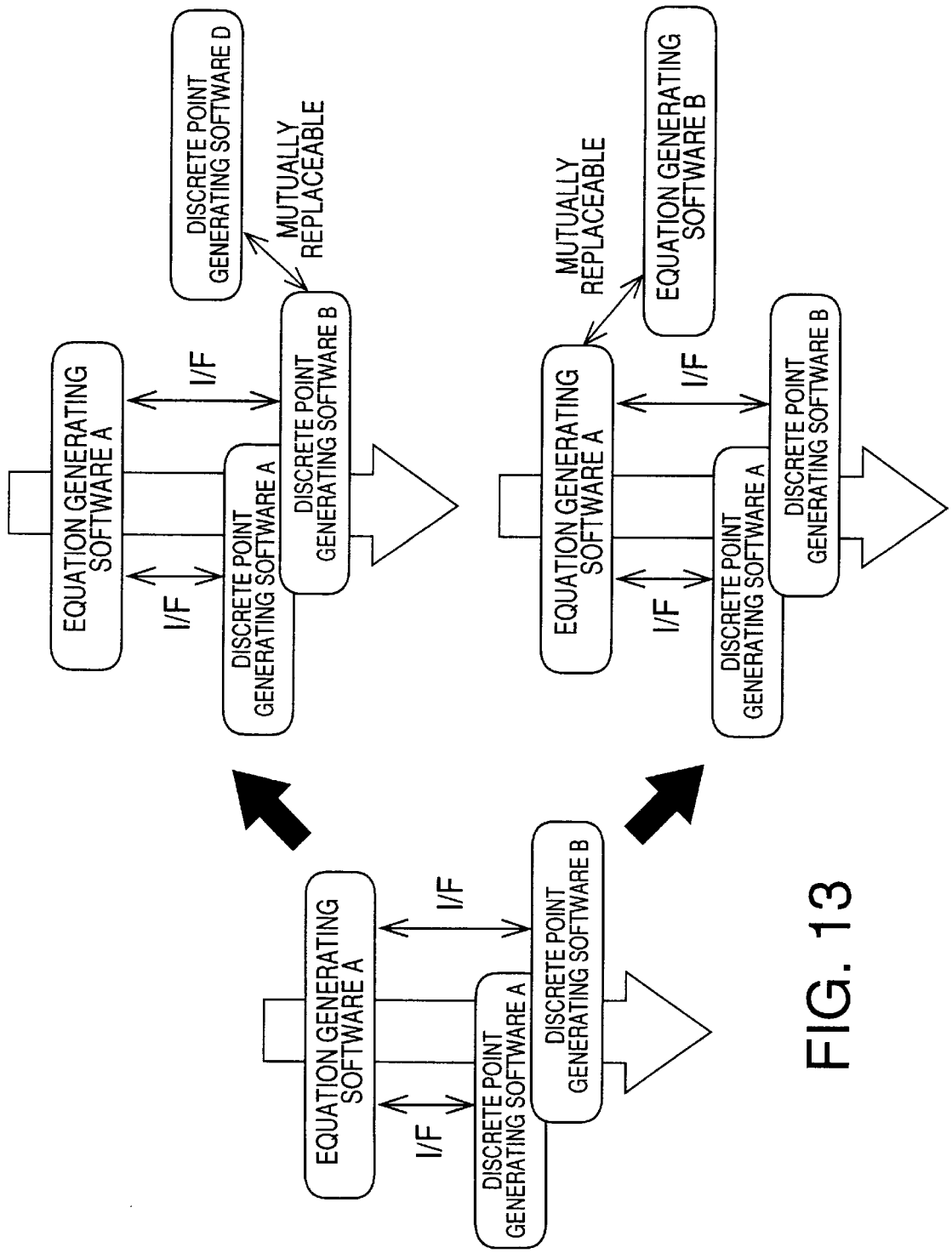
Figure 14:
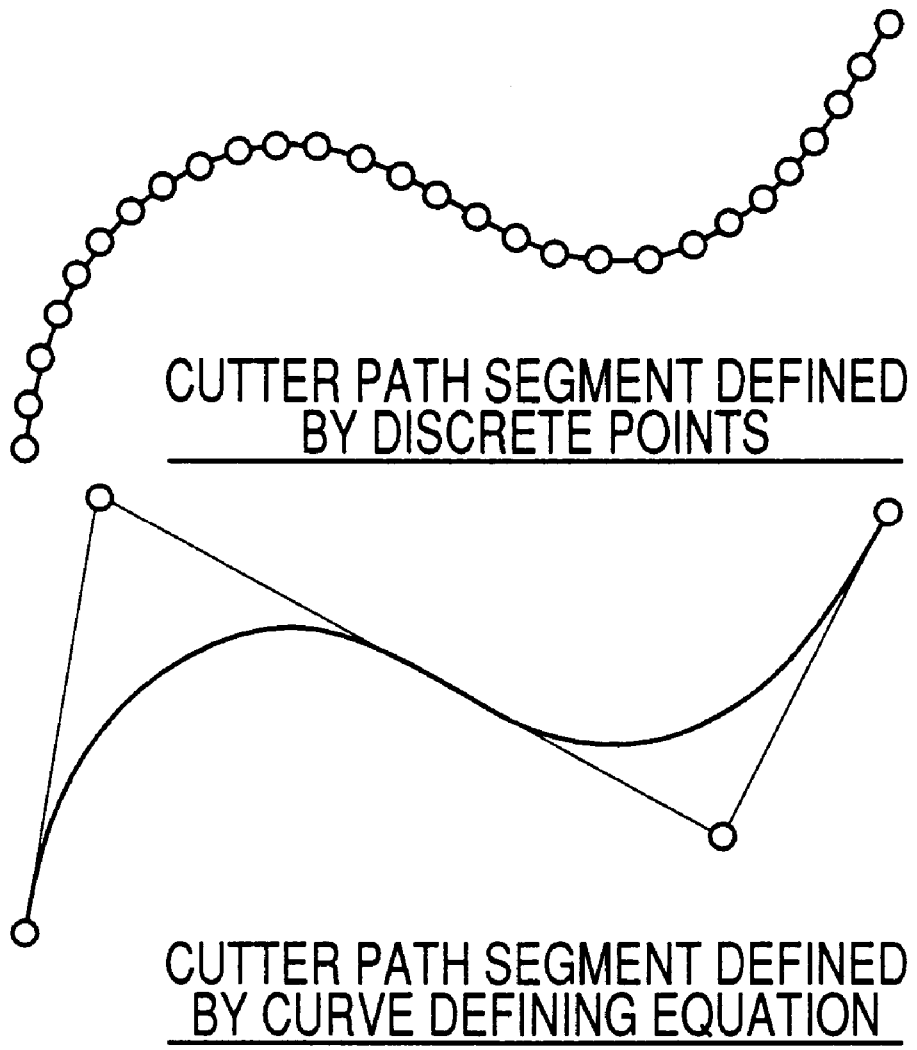
Figure 16:
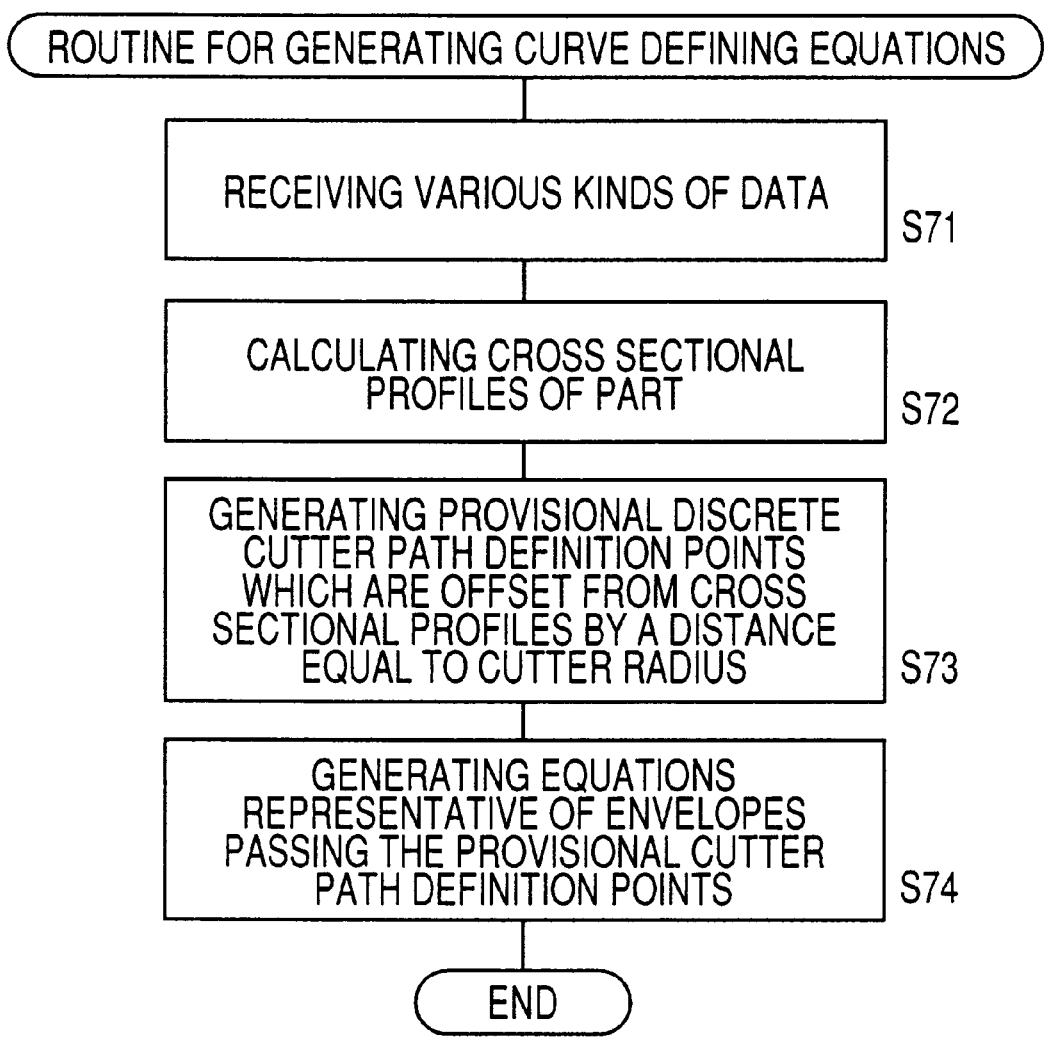
Figure 17:
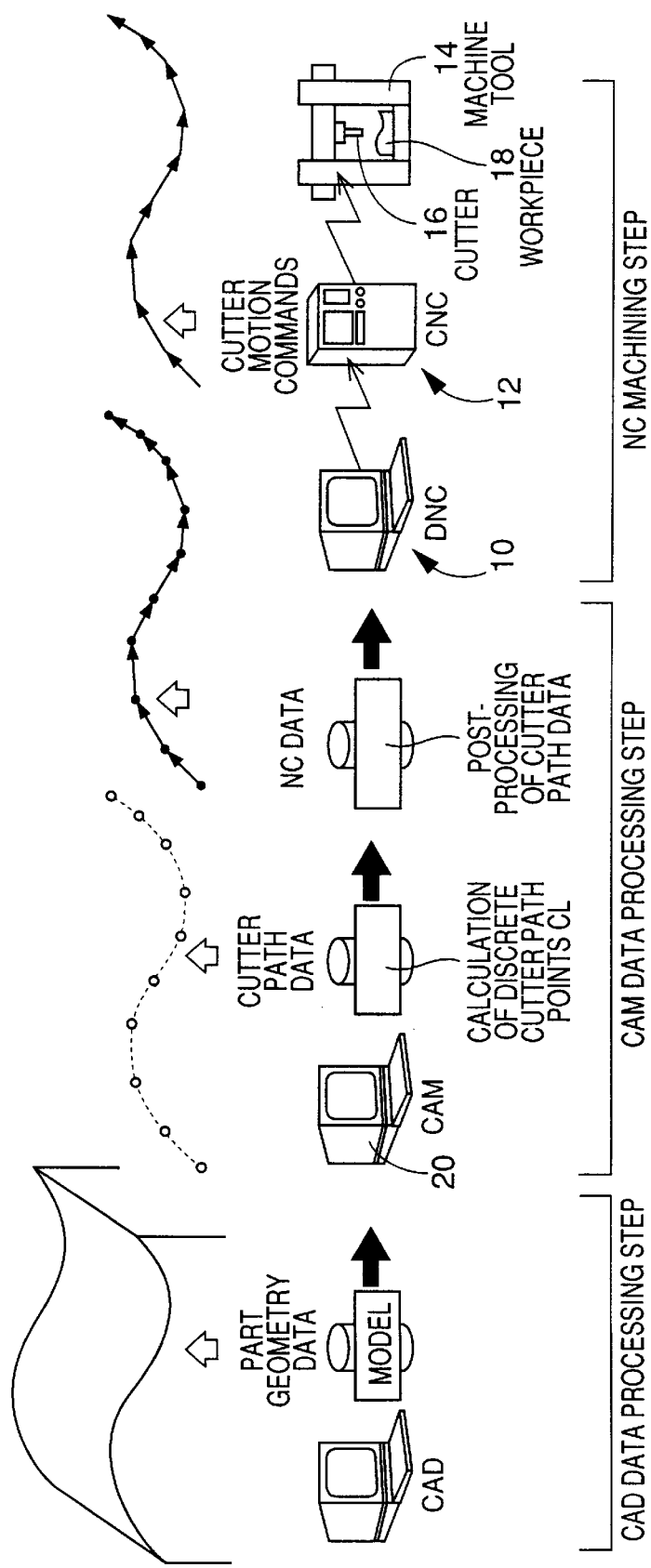
Figure 18:
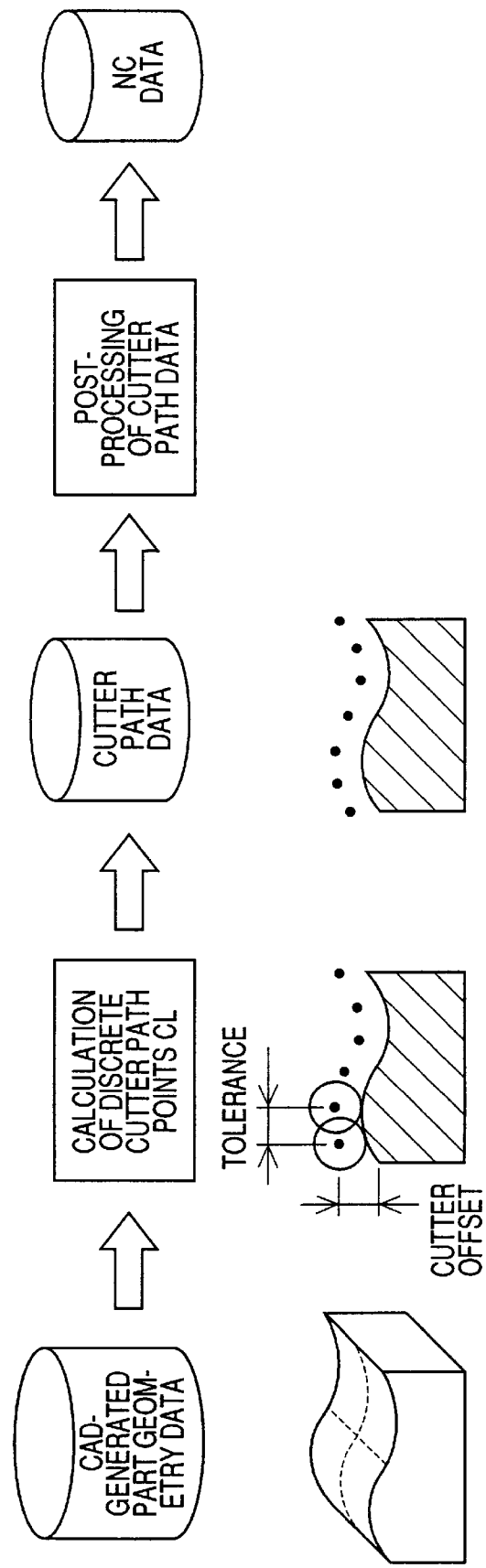
Figure 19:
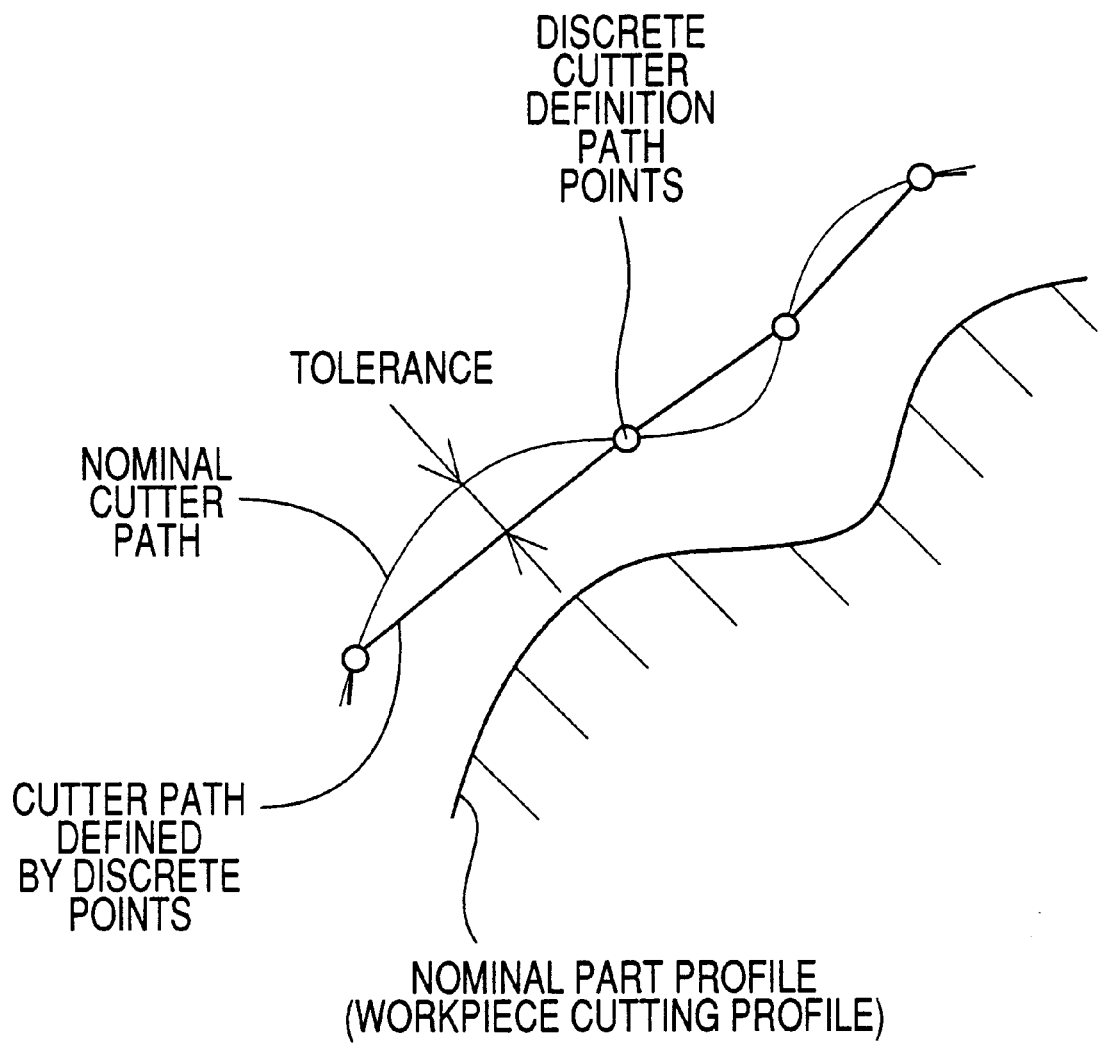

2 and which is stored in a data storage medium in an external memory device of the apparatus;

FIG. 4 is a flow chart illustrating a routine for generating curve defining equations, which is executed in step S2 of the flow chart of FIG. 3;

FIG. 5 is a flow chart illustrating a first routine for generating discrete cutter path definition points in step S3 of the flow chart of FIG. 3;

FIG. 6 is a flow chart illustrating a second routine for generating the discrete cutter path definition points in step S3 of the flow chart of FIG. 3;

FIG. 7 is a flow chart illustrating a third routine for generating the discrete cutter path definition points in step S3 of the flow chart of FIG. 3;

FIG. 8 is a perspective view schematically illustrating an operation in step S2 of the flow chart of FIG. 3;

FIG. 9 is a perspective view schematically illustrating an operation in step S3 of the flow chart of FIG. 3;

FIG. 10 is a perspective view schematically illustrating an operation in step S4 of the flow chart of FIG. 3;

FIGS. 11A, 11B and 11C are views for explaining an operation in step S34 of the flow chart of FIG. 5;

FIG. 12 is a plan view schematically showing an operation in steps S36, S45 and S55 of the flow charts of FIGS. 5, 6 and 7;

FIG. 13 is a view for schematically illustrating relationships between softwares for generating the curve defining equations and softwares for generating the discrete cutter path definition points, in the computer of the cutter path data generating apparatus of FIG. 2;

FIG. 14 is a view for schematically explaining a difference in required volume of the cutter path data in a case where the cutter path is defined by discrete points and in a case where the cutter path is defined by the curve defining equations;

FIG. 15 is a view for schematically explaining a difference in machining accuracy and speed in the above-indicated two cases;

FIG. 16 is a flow chart illustrating a routine which is executed by a computer adapted to practice a cutter path data generating process according to another embodiment of this invention, for generating curve defining equations;

FIG. 17 is a view showing a series of steps of a process of machining a workpiece on a numerical control machine tool;

FIG. 18 is a view showing the conventional CAM step in the process of FIG. 17; and FIG. 19 is a view for explaining a technique for defining a cutter path by discrete cutter path definition points.

DETAILED DESCRIPTION OF THE PREFERRED EMBODIMENT

Referring to the drawings, there will be described one embodiment of this invention, which is applicable to the CAM data processing step shown in FIG. 17 adapted to perform an NC machining operation on a workpiece with a cutter in the form of an end mill.

First, the present embodiment will be briefly explained in comparison with the conventional CAM data processing step.

In the conventional CAM data processing step, a series of operations are performed as shown in FIG. 18. Initially, a CAM processor receives part geometry data such as surface models or solid models, which have been generated in the CAD data processing step. Then, successive discrete cutter path definition points which generally define a cutter path are calculated on the basis of the received part geometry data, tolerance data and cutter geometry data. The tolerance data represent a tolerance of the accuracy to define the cutter path. Namely, the tolerance is a permissible maximum amount of deviation of the cutter path generally defined by the discrete points, from a nominal cutter path which exactly follows the nominal part profile. The cutter geometry data represent the geometry of the cutter, and include data representative of the radius of the cutter. The discrete cutter path definition points are offset or spaced apart from the desired cutting profile of the workpiece in the direction away from the cutting profile, by a distance determined by the radius of the tool. The distances between the adjacent discrete points are determined so that the deviation of the cutter path generally defined by the discrete points with respect to the nominal cutter path following the cutting profile of the workpiece (nominal part profile) is held within the tolerance indicated above. Then, cutter path data representative of the calculated discrete cutter path definition points are stored into a memory or data file of the CAM processor. The cutter path data are subjected to a post-processing operation, whereby NC data corresponding to the cutter path data are generated. The thus obtained NC data can be processed by a DNC (direct numerical control device) 10 shown in FIG. 17.

Figure 1:
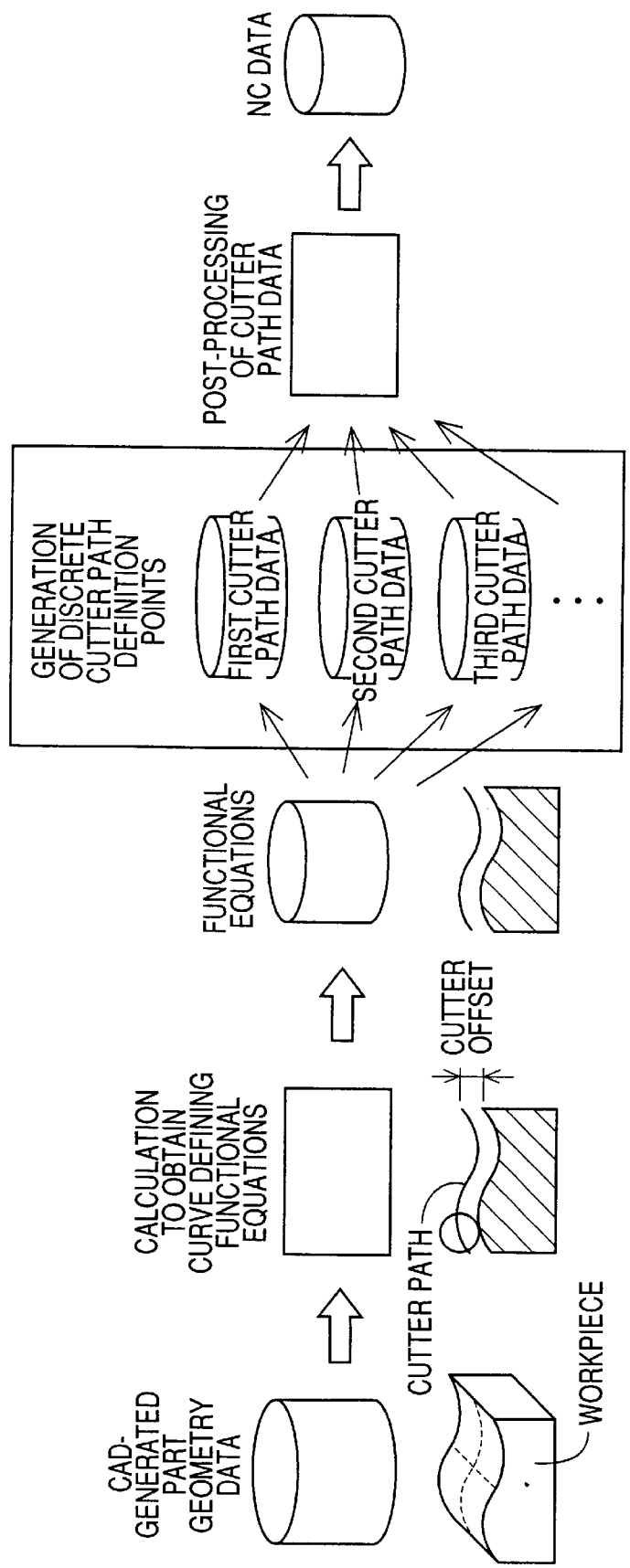
FIG. 1 is a view schematically showing steps of a process of generating discrete cutter path definition points according one embodiment of the present invention.

On the other hand, the CAM data processing step according to the present embodiment of the invention is arranged as shown in FIG. 1. Initially, the part geometry data are received by a CAM processor. Then, calculating operations are performed on the basis of the part geometry data and the cutter geometry data including data representative of the cutter radius, to obtain curve defining functional equations (hereinafter referred to as "curve defining equations") representative of curves which generally define a nominal cutter path along which the reference point (e.g., the center point) of the cutter is moved. Subsequently, equation data representative of the curve defining equations are stored in a memory, and a succession of discrete cutter path definition points is generated on the basis of the equation data and according to one of a plurality of discrete point generating conditions which is selected by the operator. The discrete cutter path definition points generated lie on the curves represented by the curve defining equations.

In the NC machining step, a NC machine tool 14 is controlled by a CNC (computerized numerical control device) 12, such that a cutter 16 and a workpiece 18 are moved relative to each other, to machine the workpiece 18 to produce the desired part.

The NC machine tool 14 has a plurality of controllable axes, and is adapted to receive from the CNC 12 motion commands or pulses at a predetermined time interval T for each of the controllable axes, so that the cutter 16 is moved along the controllable axes at controllable feed rates or velocities.

In controlling the NC machine tool 14, there exist some restrictions including: (1) an upper limit $G_{Amax}$ of an actual centrifugal acceleration of the cutter 16 during its movements; and (2) upper limits $\Delta V_{AXmax}$, $\Delta V_{AYmax}$ and $\Delta V_{AZmax}$ of actual X-axis feed rate variation $\Delta V_{AX}$, actual Y-axis feed rate variation $\Delta V_{AY}$ and actual Z-axis feed rate variation $\Delta V_{AZ}$, respectively. The variations $\Delta V_{AX}$, $\Delta V_{AY}$ and $\Delta V_{AZ}$ are variations in actual X-axis, Y-axis and Z-axis feed rates $V_{AX}$, $V_{AY}$ and $V_{AZ}$.

In the present NC machine tool 14, the velocity of a resultant movement of the cutter 16 is specified by the operator. This velocity is referred to as "commanded resultant cutter movement velocity $V_{CR}$". Similarly, the rotating speed of the cutter 16 about its axis is specified by the operator. This rotating speed is referred to as "commanded rotating speed $S_C$".

The present embodiment of the invention will be described in detail.

The CAM data processing step is implemented by a CAM processor in the form of a CAM computer 20 as shown in FIG. 17. As shown in FIG. 2, the computer 20 includes a data processor 22 such as a CPU (central processing unit), and a memory device 24 such as a read-only memory and a random-access memory. The computer 20 is connected to an external memory device 26 operable with a suitable data storage medium 28 such as a floppy disk. An appropriate program stored in the data storage medium 28 is read into the memory device 24 of the computer 20, and is temporarily stored in the memory device 24, so that the program is executed as needed by the data processor 22, to generate cutter path data representative of the discrete cutter path definition points, on the basis of the part geometry data, and to convert the cutter path data into the corresponding NC data. The part geometry data are received from a CAD computer 29.

The CAM computer 20 is also connected to an input device 30 such as a keyboard with a mouse, through which the operator enters various commands into the CAM computer 20. An output device 32 such as a cathode ray tube (CRT), a liquid crystal display and a printer is connected to the CAM computer 20, so that data obtained during data processing by the computer 20 or as a result of the data processing are provided on the output device 32.

A routine illustrated in the flow chart of FIG. 3 is executed by the data processor 22 of the CAM computer 20 according to the program stored in the memory device 24.

The routine of FIG. 3 is initiated with step S1 in which one of a plurality of discrete point generating conditions is selected according to a command entered by the operator through the input device 30. In the present embodiment, the following three discrete point generating conditions are available and is selectable as needed.

1) First Discrete Point Generating Condition

This first condition includes a restriction or requirement that the actual centrifugal acceleration $G_A$ of the cutter 16 during its movements under the control of the CNC 12 be held equal to or lower than the upper limit $G_{Amax}$ indicated above, and a restriction or requirement that the actual X-axis, Y-axis and Z-axis feed rate variations $\Delta V_{AX}$, $\Delta V_{AY}$ and $\Delta V_{AZ}$ be held equal to or smaller than the respective upper limits $\Delta V_{AXmax}$, $\Delta V_{AYmax}$ and $\Delta V_{AZmax}$. When the first condition is selected, the interval of the adjacent discrete cutter path definition points is determined so as to meet these restrictions or requirements. This first condition is usually selected when it is desired to operate the NC machine tool 14 so as to assure a relatively high machining efficiency.

2) Second Discrete Point Generating Condition

When this second condition is selected, the interval between the adjacent discrete cutter path definition points is determined so that the cutter 16 is able to be moved in synchronization of the supply of the command pulses from the CNC 12 to the NC machine tool 12. The second condition is also selected when the relatively high machining efficiency is desired.

3) Third Discrete Point Generating Condition

When this third condition is selected, the interval between the adjacent discrete cutter path definition points is determined so that the distance of movement of the cutter 16 per tooth under the control of the CNC 12 is held constant during the NC machining operation. This third condition is usually selected when it is desired to manufacture the desired part with a comparatively high degree of accuracy.

For the CAM computer 20 to generate the discrete cutter path definition points (cutter path data) so as to meet the selected one of the three conditions indicated above, the data storage medium 28 of the external memory device 26 also stores discrete point generating programs corresponding to the three conditions.

Step S1 of the routine of FIG. 3 is followed by step S2 in which an equation generating program is read out from the external memory device 26 into the memory device 24 of the CAM computer 20, and is executed by the data processor 24, to generate the curve defining equations on the basis of the part geometry data and the cutter data described above.

An example of a routine executed according to the equation generating program is illustrated in the flow chart of FIG. 4.

The routine of FIG. 4 is initiated with step S11 in which the CAM computer 20 receives various kinds of data such as the part geometry data and the cutter data including the cutter radius data.

Then, the control flow goes to step S12 in which a first cutter path definition plane is calculated on the basis of the part geometry data and the cutter radius data. The first cutter path definition plane is offset by a distance determined by the radius of the cutter, from the desired cutting profile of the workpiece 18 represented by the part geometry data, in the direction away from the workpiece 18. A cutter path along which the cutter 16 is moved is defined as a line of intersection between two cutter path definition planes. One of these two planes is the first cutter path definition plane which is offset from the desired cutting profile of the workpiece 18, by the distance determined by the cutter radius, in the direction away from the desired cutting profile of the workpiece.

Step S12 is followed by step S13 in which the other of the two cutter path definition planes, namely, the second cutter path definition plane is calculated on the basis of a command which is entered by the operator and which specifies a desired amount of stock removal from the workpiece 18 by one cutting pass of the cutter 16. This amount of stock removal is referred to as "in-feed increment". Described more specifically, each of a plurality of flat or curved planes which are spaced apart from each other by a distance equal a predetermined in-feed increment of the cutter 16 is obtained as the second cutter path definition plane.

Then, the control flow goes to step S14 to obtain lines of intersection between the first cutter path definition plane and each of the second cutter path definition planes. These lines of intersection correspond to respective nominal cutter paths. Curve defining equations representative of these nominal cutter paths are obtained. For example, the curve defining equations represent Bezier curves. A plurality of nominal cutter paths are indicated by arrow-headed lines in FIG. 8, by way of example. In this specific example of FIG. 8, the second cutter path definition planes are curved planes. It is noted that step S14 is formulated to obtain each of curve defining equations which represent respective curved segments that are connected to each other to define a nominal cutter path. In the example of FIG. 8, the cutter paths correspond to respective cutting passes of the cutter 16 taken in the feeding direction indicated by the arrows. Each cutting pass is taken to remove the stock from the workpiece 18 by the predetermined amount corresponding to the in-feed increment. As the number of the cutting passes along the respective cutter paths increases, the total amount of stock removal from the workpiece 18 increases.

Referring back to the flow chart of FIG. 3, step S2 to obtain the curve defining equations is followed by step S3 in which the discrete point generating program corresponding to the discrete point generating condition selected in step S1 is read out from the external memory device 26 into the memory device 24 of the CAM computer 20, and is executed by the data processor 22. As a result, the discrete cutter path definition points are generated for each nominal cutter path, as indicated in FIG. 9.

Where the first discrete point generating condition is selected, a routine illustrated in the flow chart of FIG. 5 is executed according to the corresponding discrete point generating program. This routine of FIG. 5 is repeatedly executed for each of the curved segments of each nominal cutter path. This repetition also applies to the programs corresponding to the second and third discrete point generating conditions. In the first cycle of execution of the routine of FIG. 5, the first curved segment of the nominal cutter path is processed.

The routine of FIG. 5 is initiated with step S31 in which a minimum radius $R_{MIN}$ of curvature of the curved segment in question of the nominal cutter path is calculated on the basis of the corresponding curve defining equation. The minimum radius $R_{MIN}$ is the radius R of one of curved portions of the curved segment which has the smallest radius.

Step S31 is followed by step S32 in which the upper limit $V_{ARmax}$ of the actual resultant cutter movement velocity $V_{AR}$ of the cutter 16 is calculated on the basis of the calculated minimum radius $R_{MIN}$ of curvature of the first curved segment, and the upper limit $G_{Amax}$ of the actual centrifugal acceleration $G_A$, and according to the following equation:

$$V_{ARmax} = \sqrt{(R_{MIN})} \times \sqrt{(G_{Amax})}$$

If the thus calculated upper limit $V_{ARmax}$ of the actual resultant cutter movement velocity $V_{AR}$ of the cutter 16 is larger than the commanded resultant cutter movement velocity $V_{CR}$, the commanded value $V_{CR}$ is set as the upper limit $V_{ARmax}$.

Then, the control flow goes to step S33 in which the CAM data computer 20 receives the upper limits $\Delta V_{AXmax}$, $\Delta V_{AYmax}$ and $\Delta V_{AZmax}$ of the variations $\Delta V_{AX}$, $\Delta V_{AY}$ and $\Delta V_{AZ}$ of the X-axis, Y-axis and Z-axis feed rates $V_{AX}$, $V_{AY}$ and $V_{AZ}$. Step S33 is followed by step S34 in which an upper limit $\theta_{max}$ of a change angle $\theta$ of the cutter path direction is calculated for each axis, by dividing the upper limit $\Delta V_{AXmax}$, $\Delta V_{AYmax}$, $\Delta V_{AZmax}$ by the upper limit $V_{ARmax}$ of the actual resultant cutter movement velocity $V_{AR}$. The change angle $\theta$ is an angle by which the direction of the cutter path is changed from one direction to another. When the cutter path direction change angle $\theta$ is smaller than the upper limit $\theta_{max}$, the feed rate variations $\Delta V_{AX}$, $\Delta V_{AY}$ and $\Delta V_{AZ}$ will not exceed the respective upper limits $\Delta V_{AXmax}$, $\Delta V_{AYmax}$ and $\Delta V_{AZmax}$. Described in detail, the upper limit $\theta_{max}$ is calculated according to the following equation:

$$\theta_{max} = \sin^{-1}(\Delta V_{Amax}/V_{ARmax})$$

wherein $\Delta V_{Amax}$ generically represents the upper limits $\Delta V_{AXmax}$, $\Delta V_{AYmax}$ and $\Delta V_{AZmax}$.

The principle of calculating the upper limit $\theta_{max}$ will be described more specifically by reference to FIGS. 11A, 11B and 11C.

Suppose the cutter 16 is actually moved along a bent cutter path consisting of straight segments defined by three discrete cutter path definition points CL1, CL2 and CL3, as indicated in FIG. 11A, at a velocity equal to the upper limit $V_{ARmax}$ of the actual resultant cutter movement velocity $V_{AR}$. The bent cutter path deviates from a nominal circular arc cutter path CP having a radius R. For the sake of explanation, the nominal cutter path CP lies on the X-Y plane, and is positioned such that the straight segment CL1-CL2 is aligned with the X axis, as indicated in FIG. 11B.

As described above, it is required that the variation $\Delta V_{AX}$ of the X-axis feed rate $V_{AX}$ of the cutter 16 be equal to or smaller than the upper limit $\Delta V_{AXmax}$, in order to assure a substantially constant A-axis movement velocity of the cutter 16. The variation $\Delta V_{AX}$ is an amount of change of the X-axis feed rate $V_{AX}$ between the two successive incremental feeding motions corresponding to the respective two successive motion commands. The first motion takes place between the discrete points CL1 and CL2, and the second or last motion takes place between the discrete points CL2 and CL3. Therefore, the actual X-axis feed rate $V_{AX}$ during the second motion from CL2 to CL3 satisfies the following condition:

$$V_{ARmax} - \Delta V_{AXmax} \leq V_{AX} \leq V_{ARmax} + \Delta V_{AXmax}$$

Similarly, the variation $\Delta V_{AY}$ of the Y-axis feed rate $V_{AY}$ should be smaller than the upper limit $\Delta V_{AYmax}$, and the actual Y-axis feed rate $V_{AY}$ during the second motion from CL2 to CL3 satisfies the following condition:

$$-\Delta V_{AYmax} \leq V_{AY} \leq \Delta V_{AYmax}$$

The position of the discrete point CL3 to which the cutter 16 is moved according to the second motion command is determined to satisfy the following two conditions:

(1) The actual resultant cutter movement velocity $V_{AR}$ is equal to the upper limit $V_{ARmax}$. Namely, the discrete point CL3 lies on a circle which has a center at the discrete point CL2 and a radius corresponding to the upper limit $V_{ARmax}$.

(2) The feed rate variations $\Delta V_{AX}$ and $\Delta V_{AY}$ should not exceed the upper limits $\Delta V_{AXmax}$ and $\Delta V_{AYmax}$, respectively.

Therefore, the upper limit $\theta_{max}$ of the cutter path direction change angle $\theta$ for the Y axis is represented by $\sin^{-1}(\Delta V_{AYmax}/V_{ARmax})$ Generically, the upper limit $\theta_{max}$ for each axis is represented by $\sin^{-1}(\Delta V_{Amax}/V_{ARmax})$.

Thus, there exist the restrictions or requirements, namely, the upper limit $\theta_{max}$ of the change angle $\theta$ of the cutter path direction, and the upper limits $\Delta V_{AXmax}$, $\Delta V_{AYmax}$, $\Delta V_{AZmax}$ of the variations $V_{AXmax}$, $V_{AYmax}$, $V_{AZmax}$ of the actual X-axis, Y-axis and Z-axis feed rates or velocities $V_{AX}$, $V_{AY}$, $V_{AZ}$, as well as the upper limit $G_{Amax}$ of the actual centrifugal acceleration of the cutter 16, that is, the upper limit $V_{ARmax}$ of the actual resultant cutter movement velocity $V_{AR}$. These restrictions or requirements should be met in order to permit the actual X-axis, Y-axis and Z-axis feed rates $V_{AX}$, $V_{AY}$, $V_{AZ}$ and the actual resultant cutter movement velocity $V_{AR}$ to be held substantially constant while the cutter 16 is moved along the bent cutter path.

Referring back to the flow chart of FIG. 5, step S34 is followed by step S35 to calculate a distance or interval between adjacent discrete cutter path definition points which are to be obtained on the curved segment in question represented by the curve defining equation. Described in detail by reference to FIG. 11C, a length L of each straight segment between the adjacent discrete cutter path definition points (CL1, CL2, CL3) to be obtained is calculated by substantial multiplication of the calculated upper limit $\theta_{max}$ and the minimum radius $R_{MIN}$ of curvature of the curved segment, according to the following equation:

$L = 2 \times R_{MIN} \times \sin(\theta_{max}/2)$

Then, the control flow goes to step S36 in which a succession of discrete cutter path definition points (CL) is obtained such that the discrete points lie on the curved segment in question and are spaced apart from each other by the distance equal to the length L calculated in step S35.

Described more specifically referring to FIG. 12, a sphere having a radius equal to the length L is moved such that the center of the sphere is held on the curved segment in question of the nominal curved cutter path CP. Initially, the center of the sphere is located at one end of the curved segment. The position of this one end of the curved segment is determined as the first discrete cutter path definition point lying on the curved segment. Then, the sphere is moved by the distance equal to its radius L. One of the two points of intersection between the sphere and the curved segment in question which is remote from the above-indicated one end of the curved segment is determined as the second discrete cutter path definition point. The movement of the sphere and the determination of the point of intersection are repeated until the point of intersection remote from the above-indicated one end of the curved segment in question lies on the next curved segment. Thus, the discrete cutter path definition points on the first curved segment represented by the first curve defining equation are generated in the first cycle of execution of the routine of FIG. 5.

Usually, the point of intersection of the sphere and the nominal cutter path CP which is obtained by the last movement of the sphere along the present curved segment does not lie on the other end of the present curved segment. In this case, this point of intersection is not used as the last discrete cutter path definition point obtained for the present curved segment, but the above-indicated other end of the present curved segment is determined as the last discrete cutter path definition point. Thus, all end points of the curved segments are determined as the discrete cutter path definition points.

However, the last obtained point of intersection which lies on the next curved segment may be determined as the last discrete cutter path definition point for the present curved segment. In this case, the end point of the present curved segment is not used as the discrete cutter path definition point.

While the process of generating the discrete cutter path definition points where the first discrete point generating condition is selected has been described above, a routine illustrated in the flow chart of FIG. 6 is executed where the second discrete point generating condition is selected. The routine of FIG. 6 is executed according to the discrete point generating program corresponding to the second discrete point generating condition.

The routine of FIG. 6 is initiated with step S41 in which the minimum radius $R_{MIN}$ of curvature of the curved segment defined by the curve defining equation in question is calculated, in the same manner as described above with respect to step S31. Step S41 is followed by step S42 in which the upper limit $V_{ARmax}$ of the actual resultant cutter movement velocity $V_{AR}$ of the cutter 16 is calculated, as in step S32.

Then, the control flow goes to step S43 in which the CAM computer 20 receives the time interval T, and then to step S44 to calculate the length or distance L between discrete cutter path definition points to be obtained for the present curved segment. The distance L is calculated by multiplying the upper limit $V_{ARmax}$ of the actual resultant cutter movement velocity $V_{AR}$ by the time interval T. Namely, $L = V_{ARmax} \times T$.

The time interval T is a smallest time interval at which the CNC 12 can apply successive motion commands to the NC machine tool 14 to feed the cutter 16 along each of the X-, Y- and Z-axes.

Then, step S45 is implemented to generate the discrete cutter path definition points on the present curved segment, as in step S36. Steps S41–S45 are repeatedly implemented for each of the curved segments of the nominal curved cutter path.

Where the third discrete point generating condition is selected, a routine illustrated in the flow chart of FIG. 7 is executed according to the discrete point generating program corresponding to the third discrete point generating condition.

The routine of FIG. 7 is initiated with step S51 in which the minimum radius $R_{MIN}$ of curvature of the curved segment in question is calculated, as in steps S31 and S41. Step S51 is followed by step S52 in which the upper limit $V_{ARmax}$ of the actual resultant cutter movement velocity $V_{AR}$ of the cutter 16 is calculated, as in steps S32 and S42.

Then, the control flow goes to step S53 in which the CAM computer 20 receives the commanded rotating speed $S_C$ of the cutter 16, and the number N of the cutting blades or or inserts of the rotary cutter 16. Step S53 is followed by step S54 to calculate the length or distance L between discrete cutter path definition points to be obtained for the present curved segment. The distance L is calculated by dividing the upper limit $V_{ARmax}$ of the actual resultant cutter movement velocity $V_{AR}$ by a product of the commanded rotating speed $S_C$ and the cutter tooth number N. Namely, $L = V_{ARmax}/(S_C \times N)$.

Then, step S55 is implemented to generate the discrete cutter path definition points on the present curved segment, as in steps S36 and S45. Steps S51–S55 are repeatedly implemented for each of the curved segments of the nominal curved cutter path.

After the discrete cutter path definition points on the nominal cutter path are generated according to the selected discrete point generating condition and program, the control goes to step S4 of FIG. 3, in which auxiliary movement data are generated to control auxiliary movements of the cutter 16 that are necessary to permit the cutting operation to be performed according to the cutter path data representative of the discrete cutter definition points. The auxiliary movement data include, for example, data for a non-cutting movement (rapid traverse movement) of the cutter 16 from a predetermined position (e.g., home position or tool change position) to the machining start position, data for a non-cutting movement (rapid traverse movement) of the cutter 16 from the machining end position to the predetermined position, and data for an in-feed movement of the cutter 16 from the position of one cutting pass (along a cutter path) to another cutting pass (along another cutter path), as indicated by arrow-headed lines in FIG. 10.

Then, the control flow goes to step S5 in which the cutter path data are converted into NC data that can be processed by the CNC 12. Thus, one cycle of execution of the routine of FIG. 3 is completed.

In the present embodiment of the invention, the curve defining equations representative of the curved segments of the nominal cutter paths are generated according to the equation generating programs, and a succession of discrete cutter path definition points is generated according to the selected one of the discrete point generating programs, which are independent of the equation generating programs. In other words, the softwares for generating the discrete cutter path definition points are independent of the softwares for generating the curve defining equations. In the present embodiment, interfaces are provided between the softwares for generating the curve defining equations (equation generating softwares) and the softwares for generating the discrete cutter path definition points (discrete point generating softwares), as shown in FIG. 13, by way of example. In this arrangement, the equation generating software A can be replaced by the equation generating software B, independently of the discrete point generating softwares. Further, the equation generating software B can be replaced by the equation generating software D, independently of the discrete point generating softwares. Thus, the present arrangement has comparatively high degrees of transparency and expansibility, being capable of efficiently, economically and easily meeting changing requirements in NC machining of workpieces to manufacture currently desired parts.

In the present embodiment, the cutter path data which represent the discrete cutter path defining points and which are generated in the CAM data processing step are converted into the NC data, which are supplied to the CNC 12. On the basis of the NC data, the CNC 12 generates cutter motion commands to move the cutter 16 so that the cutter passes the discrete cutter path definition points. While the curve defining equations representative of nominal cutter paths are generated in the CAM data processing step, these equations are not supplied to the CNC 12, but the cutter path data generated according to the curve defining equations are supplied to the CNC 12. However, the present embodiment may be modified such that the equation data representative of the curve defining equations as well as the cutter path data are supplied to the CNC 12 used in the NC machining step.

The above-indicated modified arrangement has the following advantages.

For ideal circular interpolation by the CNC 12 so as to permit the workpiece to be machined with high accuracy exactly following the desired cutting profile (nominal part profile), it is generally required to increase the number of the discrete cutter path definition points, so that the cutter path defined by the discrete points follows the nominal cutter path with accordingly increased accuracy. In the above modified arrangement wherein the equation data representative of the curve defining equations representative of the nominal cutter paths are also supplied to the CNC 12, the number of the discrete cutter path definition points generated in the CAM data processing step can be reduced, and the volume of the cutter path data can be accordingly reduced, since discrete cutter path definition points can be added by the CNC 12, on the basis of the curve defining equations which are represented by the equation data received from the CAM computer 20 and which represent represent the nominal cutter paths. Described in detail, the volume of the data representative of the discrete points required to accurately defining a given segment of a cutter path is considerably larger than the volume of the data representative of a curve defining equation representative of that curved segment, as is apparent from FIG. 14 which shows, in its upper part, a curved segment of a cutter path defined by discrete points, and shows in its upper part, a curved segment defined by a Bezier curve, by way of example. The Bezier curve is defined by a start point, an end point and two control points.

The above modified arrangement is also effective to improve the NC machining accuracy, since the discrete points which are added by the CNC 12 for interpolation between the original discrete points also lie on the nominal cutter path (nominal curved segments defined by the curve defining equations). Where only the cutter path data representative of the discrete cutter path definition points are supplied to the CNC 12, the discrete points added by the CNC 12 do not lie on the nominal cutter path, but lie on the cutter path defined by the original discrete points generated by the CAM computer 20.

In addition, the above modified arrangement is effective to increase the NC machining efficiency, since the cutter path defined by not only the original discrete points generated by the CAM computer 20 but also the additional discrete points generated by the CNC 12 permits a smooth movement of the cutter 16 without frequent changes in the direction of the movement and without frequent acceleration and deceleration upon such changes of the movement direction.

Referring next to FIG. 16, there will be described another embodiment of this invention.

In the above first embodiment of FIG. 4, the curve defining equations are generated directly on the basis of the part geometry data, and the discrete cutter path definition points are generated on the basis of the curve defining equations. In the present second embodiment of FIG. 16, provisional discrete cutter path definition points are generated on the basis of the part geometry data, and these provisional discrete points are used to generate the curve defining equations, which are used to generate final cutter path definition points.

In the present embodiment, the CAM computer 20 is adapted to execute a routine illustrated in the flow chart of FIG. 16, to generate curve defining equations in the form of envelope equations, which will be described. A program for executing this routine is stored in the data storage medium 28 of the external memory device 26.

The routine of FIG. 16 is initiated with step S71 in which the CAM computer 20 receives various kinds of data such as part geometry data described above, cutter in-feed data representative of the in-feed increment described above, and cutter radius data representative of the radius of the cutter 16.

Step S71 is followed by step S72 to perform calculation to obtain cross sectional profiles of the part on the basis of the data received in step S71. That is, the outer profiles or outlines of the part in equally spaced-apart cross sectional planes are obtained. The cross sectional planes are spaced from each other by a distance equal to the in-feed increment.

Then, the control flow goes to step S73 to generate provisional discrete cutter path definition points on the basis of the cross sectional profiles of the part and the radius of the cutter 16. These provisional discrete cutter path definition points are offset from the appropriate cross sectional profiles by a distance determined by the cutter radius, in the direction away from the workpiece 18, and are substantially equally spaced apart from each other by a predetermined small distance.

Step S74 is then implemented to generate an envelope equation representative of an envelope (.g., Bezier curve) which passes the provisional discrete cutter path definition points obtained in step S73. This envelope equation is obtained for each of segments of each nominal cutter path.

Then, final discrete cutter path definition points are generated in the same manner as in the first embodiment, except for the use of the envelope equations rather than the curve defining equations obtained in the routine of FIG. 4.

While the present invention has been described in detail in its presently preferred embodiments, by reference to the accompanying drawings, it is to be understood that the invention is not limited to the details of the illustrated embodiments, but may be embodied with various changes, modifications and improvements, which may occur to those skilled in the art, without departing from the spirit and scope of the invention defined in the following claims:

What is claimed is:

1. A process of generating a succession of discrete points to be followed by a cutter during movements of the cutter to machine a workpiece, comprising:

a step of operating a computer including a data processor, to select at least one of a plurality of different discrete point generating conditions which are different in kind from each other and which are stored in a memory of said computer, according to a command entered by an operator of the computer, said different discrete point generating conditions including a plurality of cutter-velocity-related requirements which are associated with movement velocities of the cutter during machining of the workpiece and which are different in kind from each other, each of said different discrete point generating conditions including at least one of said cutter-velocity-related requirements all of which should be satisfied when said discrete points are generated so as to define a cutter path;

a step of operating said computer to calculate an interval of said discrete points in the direction of said succession, according to the selected at least one of said discrete point generating conditions; and a step of operating said computer to generate said discrete points on the basis of the calculated interval, such that said discrete points are spaced apart from each other by said interval in the direction of said succession.

2. A process according to claim 1, wherein each of said plurality of different discrete point generating conditions includes a plurality of cutter-velocity-related requirements which are associated with movement velocities of said cutter during machining of the workpiece and which are different in kind from each other.

3. A process according to claim 1, further comprising a step of generating curve defining functional equations representative of curves which define a nominal cutter path, on the basis of a geometry of a part to be manufactured by machining of said workpiece, and wherein said discrete points are generated on the basis of the generated functional equations and said interval of said discrete points.

4. A process according to claim 1, wherein said different discrete point generating conditions include a requirement that a centrifugal acceleration of the cutter during machining of the workpiece by the cutter be held lower than a predetermined upper limit, and wherein said interval of said discrete points is calculated on the basis of said upper limit.

5. A process according to claim 1, wherein said cutter-velocity-related requirements include a predetermined upper limit of a resultant movement velocity of said cutter during movements of the cutter along controllable axes of a machine tool to machine the workpiece according to motion commands supplied to the machine tool at a predetermined time interval, and wherein said interval of said discrete points is calculated on the basis of said time interval and said upper limit.

6. A method of machining a workpiece by a cutter movable on a machine tool, comprising:

a process defined in claim 1 of generating a succession of discrete points to be followed by said cutter during movements of the cutter to machine said workpiece;

a step of generating motion commands to move said cutter along the cutter path defined by said discrete points generated in said process; and a step of controlling said machine tool to move said cutter according to said motion commands.

7. A computer readable medium having a program for executing a process defined in claim 1.

8. A process of generating a succession of discrete points to be followed by a cutter during movements of the cutter to machine a workpiece, comprising:

a step of calculating an interval of said discrete points in the direction of said succession, so as to meet at least one cutter-velocity-related requirement associated with movement velocities of said cutter during machining of the workpiece; and a step of generating said discrete points on the basis of the calculated interval, such that said discrete points are spaced apart from each other by said interval in the direction of said succession;

wherein said at-least one cutter-velocity-related requirement includes a requirement that a centrifugal acceleration of the cutter during machining of the workpiece by the cutter be held lower than predetermined upper limit and wherein said interval of said discrete points is calculated on the basis of said upper limit.

9. A process according to claim 8, further comprising a step of generating curve defining functional equations representative of curves which define a nominal cutter path, on the basis of a geometry of a part to be manufactured by machining of said workpiece, and wherein said discrete points are generated on the basis of the generated functional equations and said interval of said discrete points.

10. A process according to claim 8, wherein said at least one cutter-velocity-related requirement includes a predetermined upper limit of a resultant movement velocity of said cutter during movements of the cutter along controllable axes of a machine tool to machine the workpiece according to motion commands supplied to the machine tool at a predetermined time interval, and wherein said interval of said discrete points is calculated on the basis of said time interval and said upper limit of said resultant movement velocity.

11. A method of machining a workpiece by a cutter movable on a machine tool, comprising:

a process defined in claim 8 of generating a succession of discrete points to be followed by said cutter during movements of the cutter to machine said workpiece;

a step of generating motion commands to move said cutter along the cutter path defined by said discrete points generated in said process; and a step of controlling said machine tool to move said cutter according to said motion commands.

12. A computer readable medium having a program for executing a process defined in claim 8.

13. A process according to claim 8, wherein said step of calculating an interval includes a step of calculating an upper limit of a movement velocity of the cutter in the direction of said succession of the discrete points, on the basis of a radius of curvature representative of each curved segment of a nominal cutter path and said predetermined upper limit of said centrifugal acceleration of the cutter; and a step of calculating said interval of the discrete points on the basis of the calculated upper limit of the movement velocity of the cutter.

14. A process of generating a succession of discrete points to be followed by a cutter during movements of the cutter to machine a workpiece, comprising:

a step of operating a computer including a data processor, to select at least one of a plurality of different discrete point generating conditions stored in a memory of said computer, according to a command entered by an operator of the computer, said different discrete point generating conditions including a plurality of cutter-velocity-related requirements which are associated with movement velocities of said cutter during machining of the workpiece and which are different in kind from each other, each of said different discrete point generating conditions including at least one of said cutter-velocity-related requirements that should be satisfied when said discrete points are generated so as to define a cutter path;

a step of operating said computer to calculate an interval of said discrete points in the direction of said succession, according to the selected at least one of said discrete point generating conditions; and a step of operating said computer to generate said discrete points on the basis of the calculated interval, such that said discrete points are spaced apart from each other by said interval in the direction of said succession;

wherein said cutter-velocity-related requirements include predetermined upper limits of variations in feed rates of said cutter during feeding movements thereof along respective controllable axes of a machine tool, each of said variations being an amount of change in the feed rate of said cutter along a corresponding one of said controllable axes, between two successive motions of said cutter which correspond respective two motion commands successively supplied to said machine tool at a predetermined time interval, and wherein said interval of said discrete points is calculated on the basis of said upper limits of said variations.

15. A process of generating a succession of discrete points to be followed by a cutter during movements of the cutter to machine a workpiece, comprising:

a step of calculating an interval of said discrete points in the direction of said succession, so as to meet at least one cutter-velocity-related requirement associated with movement velocities of said cutter during machining of the workpiece; and a step of generating said discrete points on the basis of the calculated interval, such that said discrete points are spaced apart from each other by said interval in the direction of said succession;

wherein said at least one cutter-velocity-related requirement includes predetermined upper limits of variations in feed rates of said cutter during feeding movements thereof along respective controllable axes of a machine tool, each of said variations being an amount of change in the feed rate of said cutter along a corresponding one of said controllable axes, between two successive motions of said cutter which correspond respective two motion commands successively supplied to said machine tool at a predetermined time interval, and wherein said interval of said discrete points is calculated on the basis of said upper limits of said variations.

16. A process of generating a succession of discrete points to be followed by a cutter during movements of the cutter to machine a workpiece, comprising:

a step of operating a computer including a data processor, to select at least one of a plurality of different discrete point generating conditions stored in a memory of said computer, according to a command entered by an operator of the computer, said different discrete point generating conditions including a plurality of cutter-velocity-related requirements which are associated with movement velocities of said cutter during machining of the workpiece and which are different in kind from each other, each of said different discrete point generating conditions including at least one of said cutter-velocity-related requirements that should be satisfied when said discrete points are generated so as to define a cutter path;

a step of operating said computer to calculate an interval of said discrete points in the direction of said succession, according to the selected at least one of said discrete point generating conditions; and a step of operating said computer to generate said discrete points on the basis of the calculated interval, such that said discrete points are spaced apart from each other by said interval in the direction of said succession;

wherein said cutter-velocity-related requirements include a predetermined upper limit of a resultant movement velocity of said cutter during movements of the cutter along controllable axes of a machine tool to machine the workpiece according to motion commands supplied to the machine tool at a predetermined time interval while said cutter is rotating about an axis thereof, and wherein said interval of said discrete points is calculated on the basis of said upper limit of said resultant movement velocity, and a commanded value of a rotating speed of said cutter, which commanded value is specified by an operator of the machine tool.

17. A process of generating a succession of discrete points to be followed by a cutter during movements of the cutter to machine a workpiece, comprising:

a step of calculating an interval of said discrete points in the direction of said succession, so as to meet at least one cutter-velocity-related requirement associated with movement velocities of said cutter during machining of the workpiece; and a step of generating said discrete points on the basis of the calculated interval, such that said discrete points are spaced apart from each other by said interval in the direction of said succession;

wherein said at least one cutter-velocity-related requirement includes a predetermined upper limit of a resultant movement velocity of said cutter during movements of the cutter along controllable axes of a machine tool to machine the workpiece according to motion commands supplied to the machine tool at a predetermined time interval while said cutter is rotating about an axis thereof, and wherein said interval of said discrete points is calculated on the basis of said upper limit of said resultant movement velocity, and a commanded value of a rotating speed of said cutter, which commanded value is specified by an operator of the machine tool.

* * * * *